(12) United States Patent
Zhang et al.

(10) Patent No.: US 12,185,026 B2
(45) Date of Patent: Dec. 31, 2024

(54) FACILITATING COLLABORATION IN A WORK ENVIRONMENT

(71) Applicant: Lemon Inc., Grand Cayman (KY)

(72) Inventors: Yuhui Zhang, Los Angeles, CA (US); Hongjie Dong, Los Angeles, CA (US); Ruchir Astavans, Los Angeles, CA (US); Yibing Zhu, Los Angeles, CA (US); Yuchen Zhang, Los Angeles, CA (US); Ling Zhong, Los Angeles, CA (US); Bartosz Narkiewicz, Los Angeles, CA (US); Inchang Jung, Los Angeles, CA (US); Tiancheng Jiang, Los Angeles, CA (US); Jiamin Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/831,346

(22) Filed: Jun. 2, 2022

(65) Prior Publication Data

US 2023/0156157 A1    May 18, 2023

Related U.S. Application Data

(63) Continuation-in-part of application No. 17/527,078, filed on Nov. 15, 2021, now Pat. No. 11,677,908.

(51) Int. Cl.
*H04N 7/15* (2006.01)
*G06Q 10/10* (2023.01)
*G06Q 10/101* (2023.01)

(52) U.S. Cl.
CPC .......... *H04N 7/157* (2013.01); *G06Q 10/101* (2013.01); *G06Q 10/103* (2013.01)

(58) Field of Classification Search
None
See application file for complete search history.

(56) References Cited

U.S. PATENT DOCUMENTS

| 7,478,129 B1 | 1/2009 | Chemtob |
| 8,443,041 B1 | 5/2013 | Krantz et al. |

(Continued)

FOREIGN PATENT DOCUMENTS

| CN | 108520046 A | 9/2018 |
| EP | 2787718 A1 | 10/2014 |

(Continued)

OTHER PUBLICATIONS

U.S. Appl. No. 17/527,041, filed Nov. 15, 2021, Zhang.

(Continued)

*Primary Examiner* — Phyllis A Book
(74) *Attorney, Agent, or Firm* — BakerHostetler

(57) ABSTRACT

The present disclosure describes techniques for facilitating collaboration in a workspace. The techniques may comprise automatically displaying an avatar of a user in a representation corresponding to a first virtual room once an application starts to run on a computing device associated with the user. Display of the avatar in the representation may indicate that the user is in the first virtual room. A collaborative mode may be entered based on user input from the user. A visual element may be added to the avatar in response to entering the collaborative mode. The visual element added to the avatar may indicate that the user is available for a real-time communication with other users among the plurality of users.

20 Claims, 16 Drawing Sheets

(56) References Cited

U.S. PATENT DOCUMENTS

| | | |
|---|---|---|
| 9,749,367 B1* | 8/2017 | Kirby .................. G06Q 10/101 |
| 9,882,846 B1 | 1/2018 | Cohen et al. |
| 9,955,318 B1 | 4/2018 | Scheper et al. |
| 10,157,358 B1 | 12/2018 | Brisebois et al. |
| 10,958,600 B1 | 3/2021 | Annadata et al. |
| 11,222,454 B1 | 1/2022 | Boissiere et al. |
| 11,323,493 B1 | 5/2022 | Xi et al. |
| 11,349,890 B2 | 5/2022 | Spencer et al. |
| 11,381,411 B1 | 7/2022 | Gale et al. |
| 11,394,924 B1 | 7/2022 | Maxim |
| 11,405,436 B1* | 8/2022 | Mindlin .................. G10L 21/10 |
| 2007/0260684 A1 | 11/2007 | Sharma et al. |
| 2009/0222742 A1* | 9/2009 | Pelton .................... G06Q 10/10 715/753 |
| 2009/0251457 A1 | 10/2009 | Walker et al. |
| 2009/0300516 A1* | 12/2009 | Jerrard-Dunne ....... G06Q 10/10 715/752 |
| 2009/0300521 A1* | 12/2009 | Jerrard-Dunne ....... G06Q 10/10 715/757 |
| 2010/0251177 A1 | 9/2010 | Geppert et al. |
| 2012/0290950 A1 | 11/2012 | Rapaport et al. |
| 2012/0290954 A1 | 11/2012 | Qureshi et al. |
| 2012/0331401 A1 | 12/2012 | Tipirneni |
| 2013/0051548 A1* | 2/2013 | Chavez ................. G06Q 10/101 379/265.09 |
| 2013/0212494 A1 | 8/2013 | Heiferman et al. |
| 2013/0342534 A1* | 12/2013 | Walker .................... A63F 13/00 345/420 |
| 2014/0096036 A1* | 4/2014 | Mohler .................. G06Q 10/10 715/753 |
| 2014/0229866 A1 | 8/2014 | Gottlieb |
| 2014/0278977 A1 | 9/2014 | Newton et al. |
| 2015/0135300 A1 | 5/2015 | Ford |
| 2015/0149549 A1 | 5/2015 | Tsukamoto |
| 2016/0127689 A1 | 5/2016 | Huang |
| 2016/0309116 A1 | 10/2016 | Gottlieb |
| 2018/0098059 A1* | 4/2018 | Valdivia .................. G06F 3/011 |
| 2018/0294986 A1 | 10/2018 | Vidro et al. |
| 2018/0353860 A1 | 12/2018 | Nakamura et al. |
| 2019/0279522 A1 | 9/2019 | Jafari |
| 2020/0036667 A1 | 1/2020 | Talton et al. |
| 2020/0042526 A1 | 2/2020 | Yun et al. |
| 2020/0076746 A1 | 3/2020 | Penrose et al. |
| 2020/0100074 A1 | 3/2020 | Purohit et al. |
| 2020/0169559 A1 | 5/2020 | Jones et al. |
| 2020/0274885 A1 | 8/2020 | Cselle et al. |
| 2020/0294000 A1 | 9/2020 | Sexauer et al. |
| 2020/0328908 A1 | 10/2020 | Howland et al. |
| 2021/0014287 A1 | 1/2021 | Kimball et al. |
| 2021/0021649 A1 | 1/2021 | Rathod |
| 2021/0081897 A1 | 3/2021 | Culver et al. |
| 2021/0096695 A1 | 4/2021 | Zhang et al. |
| 2021/0224765 A1 | 7/2021 | Siddique et al. |
| 2021/0319408 A1 | 10/2021 | Jorasch et al. |
| 2021/0342785 A1 | 11/2021 | Mann et al. |
| 2021/0352244 A1 | 11/2021 | Benedetto et al. |
| 2021/0360073 A1 | 11/2021 | Rodgers et al. |
| 2021/0373741 A1* | 12/2021 | Agarawala .......... G06F 3/04815 |
| 2021/0374683 A1 | 12/2021 | Park et al. |
| 2021/0400093 A1 | 12/2021 | Ashkenazi et al. |
| 2022/0027021 A1 | 1/2022 | Bliss et al. |
| 2022/0070013 A1 | 3/2022 | Barzilay et al. |
| 2022/0070232 A1 | 3/2022 | Young |
| 2022/0108413 A1 | 4/2022 | Hack et al. |
| 2022/0124286 A1* | 4/2022 | Punwani ............. H04L 65/1093 |
| 2022/0317830 A1* | 10/2022 | Skuratowicz ....... H04L 12/1813 |
| 2022/0321370 A1* | 10/2022 | Skuratowicz ....... H04L 12/1822 |
| 2022/0321507 A1* | 10/2022 | Skuratowicz .......... G06F 3/0481 |
| 2022/0321613 A1* | 10/2022 | Lin ..................... H04L 65/1093 |
| 2023/0020654 A1 | 1/2023 | Foster et al. |
| 2023/0032545 A1* | 2/2023 | Mindlin ................ H04L 65/765 |
| 2023/0032922 A1 | 2/2023 | Lin et al. |
| 2023/0086906 A1 | 3/2023 | Tang et al. |
| 2023/0138534 A1 | 5/2023 | Adams et al. |
| 2023/0171118 A1 | 6/2023 | Oono et al. |

FOREIGN PATENT DOCUMENTS

| | | |
|---|---|---|
| JP | 2022-027062 A | 2/2022 |
| WO | WO 2015/041417 A1 | 3/2015 |
| WO | WO 2015/164521 A1 | 10/2015 |
| WO | WO 2021/154651 A1 | 8/2021 |
| WO | WO 2021/205240 A1 | 10/2021 |

OTHER PUBLICATIONS

U.S. Appl. No. 17/527,088, filed Nov. 15, 2021, Zhang.
U.S. Appl. No. 17/527,066, filed Nov. 15, 2021, Zhang.
International Patent Application No. PCT/SG2022/050806; Int'l Search Report; dated Jul. 13, 2023; 7 pages.
Withee et al; "How to Use Microsoft Teams"; web.archive.org/web/20211209010716/https://www.dummies.com/article/technology/software/Microsoft-products/general-microsoft/how-to-use-microsoft-teams-259020; Dummies; Oct. 2021; accessed May 19, 2023; 11 pages.
Harisudhakar VPD; "New and improved search results experience on Microsoft Teams"; https://web.archive.org/web/20220425173452/https://techcommunity.microsoft.com/t5/microsoft-teams-blog/new-and-improved-search-results-experience-onmicrosoft-teams/ba-p/3035064; Microsoft; Dec. 2021; accessed Feb. 17, 2024; 20 pages.
International Patent Application No. PCT/SG2023/050402; Int'l Search Report; dated Nov. 21, 2023; 4 pages.
International Patent Application No. PCT/SG2023/050375; Int'l Search Report; dated Dec. 29, 2023; 5 pages.

* cited by examiner

400

Automatically display an avatar of a user in a representation corresponding to a first virtual room once an application starts to run on a computing device associated with the user, wherein display of the avatar in the representation indicates that the user is in the first virtual room 402

Enter a collaborative mode based on receiving user input via an interface element 404

Add a visual element to the avatar in response to entering the collaborative mode, wherein the visual element added to the avatar indicates that the user is available for a real-time communication with other users among the plurality of users 406

Initiate the real-time communication with any other user among the plurality of users whose avatar indicates that the other user is available for a real-time communication 408

Automatically display an avatar of a user in a representation corresponding to a first virtual room once an application starts to run on a computing device associated with the user, wherein display of the avatar in the representation indicates that the user is in the first virtual room 502

Enter a collaborative mode based on receiving user input via an interface element 504

Add a visual element to the avatar in response to entering the collaborative mode, wherein the visual element added to the avatar indicates that the user is available for a real-time communication with other users among the plurality of users 506

Initiate the real-time communication with any other user among the plurality of users whose avatar indicates that the other user is available for a real-time communication based on detecting that an interface element is enabled, wherein the other user is also in the first virtual room 508

Automatically display an avatar of a user in a representation corresponding to a first virtual room once an application starts to run on a computing device associated with the user, wherein display of the avatar in the representation indicates that the user is in the first virtual room 602

Enter a collaborative mode based on receiving user input via an interface element 604

Add a visual element to the avatar in response to entering the collaborative mode, wherein the visual element added to the avatar indicates that the user is available for a real-time communication with other users among the plurality of users 606

Detect that the user enters a second virtual room where any other user is located 608

Display the avatar in another representation corresponding to the second virtual room in response to detecting that the user entered the second virtual room by selecting a selectable interface element 610

Initiate the real-time communication with the other user based on the detecting that the user enters the second virtual room and detecting that an interface element is enabled 612

Automatically display an avatar of a user in a representation corresponding to a first virtual room once an application starts to run on a computing device associated with the user, wherein display of the avatar in the representation indicates that the user is in the first virtual room 702

Entering a collaborative mode based on user input from the user 704

Add a visual element to the avatar in response to entering the collaborative mode, wherein the visual element added to the avatar indicates that the user is available for a real-time communication with other users among the plurality of users 706

Receive a request from the user to communicate with a subset of users in the first virtual room 708

Establish a sub-communication channel between the user and the subset of users in the first virtual room while exiting the collaborative mode 710

FACILITATING COLLABORATION IN A WORK ENVIRONMENT

CROSS REFERENCE TO RELATED APPLICATION

The present application is a continuation-in-part of U.S. patent application Ser. No. 17/527,078, filed on Nov. 15, 2021, the disclosure of which is incorporated herein by reference in its entirety.

BACKGROUND

Communication is increasingly being conducted using Internet-based tools. The Internet-based tools may be any software or platform. Existing communication platforms enable users to communicate with each other by sharing text, images, videos, and other information via app or web pages. People continue to desire new ways for communication via Internet-based tools.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example process for facilitating communication, which may be performed by a communication system in accordance with the present disclosure.

FIG. 5 shows an example process for facilitating communication, which may be performed by a communication system in accordance with the present disclosure.

FIG. 6 shows an example process for facilitating communication, which may be performed by a communication system in accordance with the present disclosure.

FIG. 7 shows an example process for facilitating communication, which may be performed by a communication system in accordance with the present disclosure.

FIG. 10 shows another example user interface for facilitating communication in accordance with the present disclosure.

DETAILED DESCRIPTION OF ILLUSTRATIVE EMBODIMENTS

Figure 1:
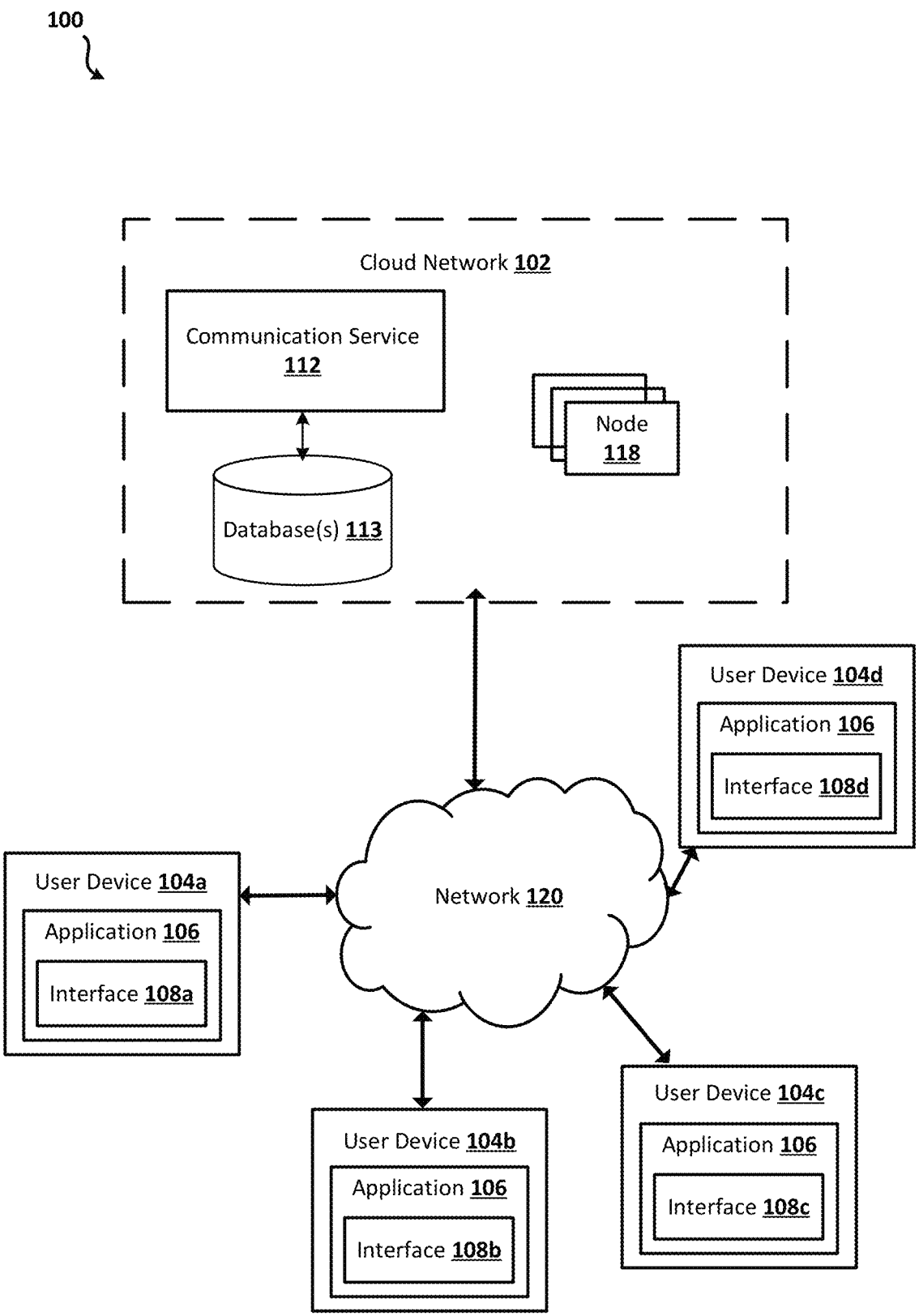
FIG. 1 shows an example system for facilitating communication in accordance with the present disclosure.

Existing internet-based communication tools may facilitate communication between two or more people, such as two or more co-workers. For example, existing internet-based communication tools may facilitate a video conference between two or more people. Likewise, existing internet-based communication tools may facilitate a text messaging and/or instant messaging exchange between two or more people.

However, such existing internet-based communication tools do not adequately replace in-person communication and collaboration. For example, when two or more people are in the same physical building or room as each other, they do not need to schedule a meeting, wait for a response to a chat or an email, or wait for each other to log online in order to communicate with each other. Instead, they can engage in frequent impromptu (e.g., spontaneous, unplanned, etc.) conversation with each other. In the workplace, such impromptu real-time communication may facilitate collaboration, productivity, efficiency, and a sense of community amongst co-workers. Conversely, existing internet-based communication tools require users to schedule meetings, wait for responses to chats or emails, or wait for other users to log online in order to communicate with them. In this manner, internet-based communication tools do not foster the same sense of collaboration, productivity, efficiency, or community amongst co-workers that in-person communication does.

Despite the advantages to in-person communication, people may sometimes need to communicate with each other from remote locations. For example, co-workers may live in different geographic locations from each other, or may work out of their homes instead of out of a central office. Thus, there exists a need for improved internet-based communication tools that provide the benefits of in-person communication and collaboration.

An improved internet-based communication tool is described herein. Such an improved internet-based communication tool addresses the shortcomings of existing internet-based communication tools and more closely simulates in-person communication. For example, the internet-based communication tool described herein may increase the amount of time that users spend engaged in impromptu real-time communication. Such an improved internet-based communication tool may be utilized as a part of the example system 100 illustrated in FIG. 1. The system 100 may comprise a cloud network 102 and a plurality of user devices 104*a-d*. The cloud network 102 and the plurality of user devices 104*a-d* may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a communication service 112. The plurality of computing nodes 118 may process tasks associated with the communication service 112.

The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the communication service 112 facilitates communication (e.g., synchronous communication and asynchronous communication) between users associated with the plurality of user devices 104*a-d*. The communication service 112 is discussed below in more detail with regard to FIG. 2.

In an embodiment, the plurality of user devices 104 are configured to access the communication service 112. For example, one or more of the user devices 104 may send, to the communication service 112, a connection request. The connection requests may comprise requests from the user devices 104*a-d* to connect to the communication service 112.

A user device 104*a-d* may comprise an application 106. The application 106 outputs (e.g., display, render, present) user interface(s) of the communication service 112 via an interface 108*a-d*. The users associated with the user devices 104*a-d* may interact with the user interface(s) of the communication service 112 to communicate with and/or build relationships with the other users of the communication service 112. For example, the user associated with the user device 104*a* may interact with the user interface(s) of the communication service 112 to communicate with and/or build relationships with one or more of the users associated with the user devices 104*b-d*.

The plurality of user devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like.

The plurality of user devices 104 may be associated with one or more users. For example, the one or more users may be co-workers or colleagues. As another example, the one or more users may be friends, students, or any other group of people that want to or need to communicate with one another. A single user may use one or more of the user devices 104 to access the cloud network 102. The plurality of user devices 104 may travel to a variety of locations and use different networks to access the cloud network 102.

The communication service 112 may be configured to store data associated with the communication service 112, such as in one or more databases 113. The one or more databases 113 may be configured to store data associated with the users of the communication service 112, data associated with virtual room(s) (e.g., space(s)) for communication provided by the communication service 112, and/or data associated with past communication, current communication, or future scheduled communication amongst the users of the communication service 112. The one or more databases 113 and the data stored within the one or more databases 113 are discussed below in more detail with regard to FIG. 2.

Figure 2:
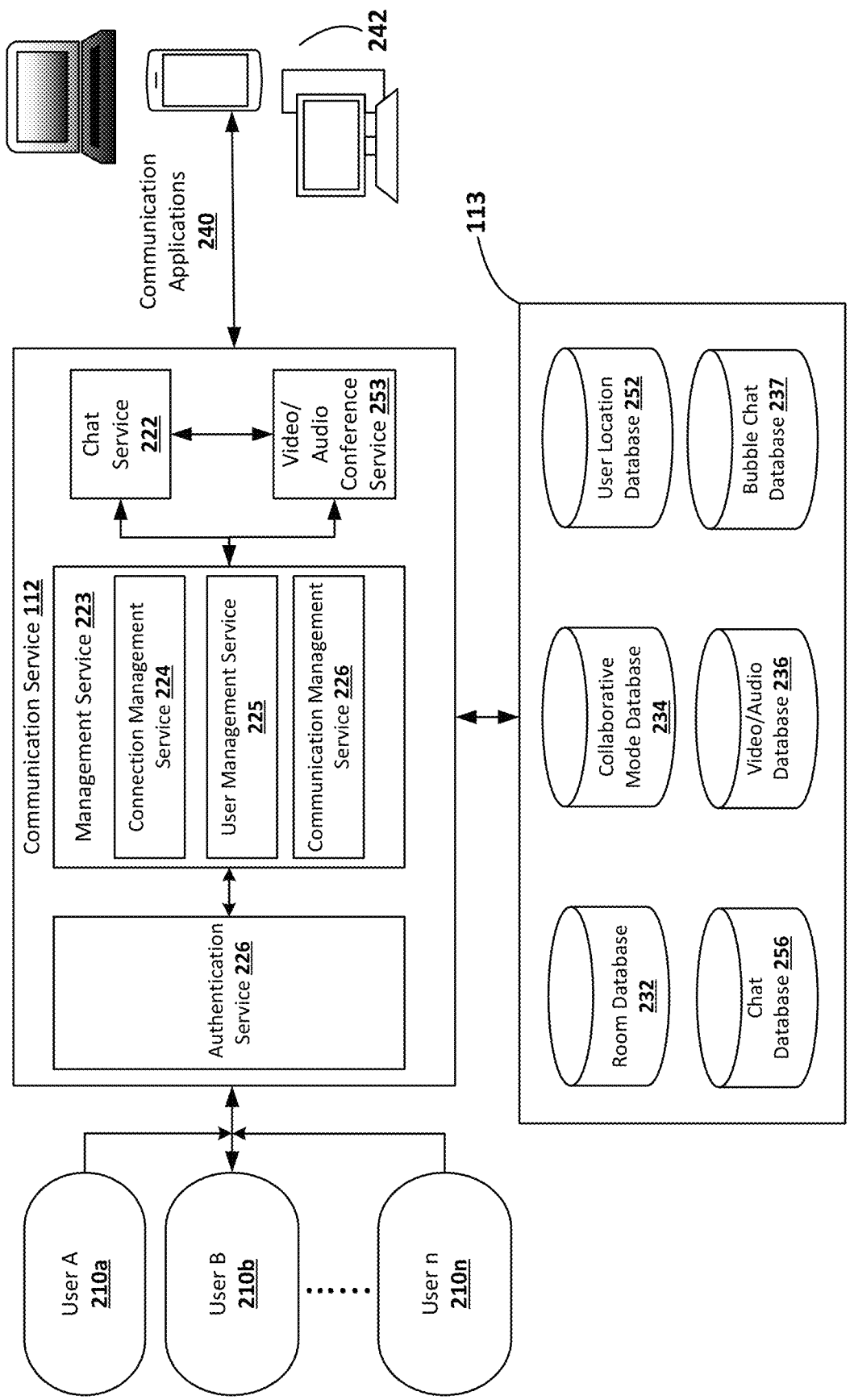
FIG. 2 shows an example system for facilitating communication in accordance with the present disclosure.

FIG. 2 shows an example system 200 for communication. The system 200 includes the communication service 112 described above with regard to FIG. 1. By way of example and without limitation, the communication service 112 may run on the cloud network 102 in FIG. 1. The communication service 112 may include a combination of cloud network devices and local devices. The communication service 112 may facilitate communication amongst the users 210*a-n*. The users 210 may be users of a communication application 240 operating on user devices 242.

The communication service 112 may include an authentication service 226. The authentication service 226 may authorize and verify access to the other services provided by the communication service 112. The authentication service 226 may grant users access to the communication service 112. For instance, the authentication service 226 may receive connection requests from the users 210*a-n*. The connection requests may be requests to connect to the communication service 226. The authentication service 226 may, in response to such connection requests, grant or deny access to users.

The communication service 112 may include a management service 223. The management service 223 may manage communication amongst users 210*a-n* that have been connected to the communication service 112. For example, the management service 223 may manage communication amongst users 210*a-n* that have been granted access to the communication service 112 by the authentication service 226. The management service 223 may include a connection management service 224, a user management service 225, and/or a communication management service 226.

In an embodiment, the communication service 112 provides a plurality of virtual room (e.g., spaces) in a workspace to the users 210*a-n*. Each of the plurality of virtual rooms may be a virtual object that allows users 210*a-n* to associate with it to exchange information that is stored in association with the virtual room. Each virtual room enables users who associate with the virtual room to communicate in real time, non-real time etc., with other users associated with the virtual room. One or more of the virtual rooms may also enable certain communications from unassociated users to be communicated with internal users. A user 210*a-n* may be present one virtual room at a time, or multiple virtual rooms at a time. At any given time, zero, one, or multiple users may be present in any given virtual room.

Each virtual room may be implemented as a data structure and one or more software functions that track users, permissions, any data that is exchanged between users 210*a-n*, and time association(s) of when users 210*a-n* associate (join the virtual room) and disassociate (leave the virtual room).

In certain embodiments, each virtual room is associated with a calendar that indicates events or meetings associated with that virtual room.

In embodiments, any user that has joined a virtual room, would have the ability to review the history of communications that occurred in the virtual room. For example, a user that joined a virtual room at a time A could peruse the history of communications that occurred in that virtual room before time A, and from that gain an understanding of the development of the communication within the virtual room over time without the need to review an archive that would otherwise lack context. In that sense, the virtual room becomes a way of organizing an information exchange while preserving the historical context around particular items of communication.

In embodiments, each of the virtual rooms may be associated with a particular topic. The users 210a-n may associate themselves with (e.g., join, enter) a virtual room that is associated with a topic of interest. Within each virtual room, the users 210a-n that have joined that virtual room can communicate with each other, such as about the topic associated with that virtual room. In some embodiments, each of the virtual rooms may be associated with a particular work project or team of co-workers.

In embodiments, the users 210a-n may need permission to join one or more of the virtual rooms from the plurality of virtual rooms. For example, the users 210a-n may need to be given access to join a particular virtual room, such as by an administrator associated with the virtual room. The users 210a-n may need permission to join some of the virtual rooms of the plurality of virtual rooms, while other virtual rooms of the plurality of spaces may be open to any user 210a-n to join (without requiring permission or authentication). In some embodiments, the users 210a-n do not need permission to join any of the virtual rooms from the plurality of spaces. Instead, the users 210a-n may freely join and leave the virtual rooms.

In embodiments, the users 210a-n may automatically be located in a default virtual room once an application 240 associated with the communication service 112 starts to run on a computing device (e.g., client device 104a-d) associated with the users 210a-n. The default virtual room may be, in some instances, selected by the users 210a-n themselves. For example, a user 210a may select a virtual room that he or she spends most of her time in or a virtual room that indicates the user's work context as that user's default virtual room. As another example, a user 210b may select a virtual room that is associated with a topic of highest interest to the user as that user's default room. The default virtual room for a particular user may, in some instances, be selected by the communication service 112. For example, the communication service 112 may automatically select a virtual room for a particular user based on that user's behaviors, work context, or preferences, such as which virtual rooms that user visits, for how long the user visits those rooms, and which projects or topics are of interest to the user. In some embodiments, the default virtual room for a particular user may be selected by that user's colleague, such as that user's boss or superior.

In some embodiments, a user 210a-n may, after opening the application 240 associated with the communication service 112 and being placed in that user's default virtual room, want to enter a different virtual room. For example, the user 210a-n may want to communicate with other users that are in a virtual room different from the user's default virtual room. As another example, the user 210a-n may want to communicate about the topic or project associated with a virtual room different from the user's default virtual room. If a user 210a-n, after opening the application 240 associated with the communication service 112 and being placed in that user's default virtual room, wants to be located in a different virtual room, the user may join (e.g., enter) the different virtual room. If the user joins the different virtual room, the user may no longer be located in that user's default virtual room.

In embodiments, the communication service 112 may display an avatar associated with each user 210a-n on an interface of the application 240. The avatar associated with a particular user may, for example, be displayed in a representation corresponding to the virtual room that the user is currently located in. In this manner, the users of the communication service 112 are able to see which virtual rooms other users are in. For example, when a user opens the application 240 associated with the communication service 112 and is placed in that user's default virtual room, an avatar associated with the user may be displayed in a representation corresponding to the user's default virtual room. If the user later enters a different room, the user's avatar will no longer be displayed in the representation corresponding to the user's default virtual room. Instead, the user's avatar will be displayed in the representation corresponding to the newly entered virtual room.

In embodiments, the connection management service 224 may connect one or more users 210a-n to a particular virtual room. For example, when a user 210a-n becomes connected to the communication service 112 (e.g., once an application 240 associated with the communication service 112 starts to run on a computing device), the connection management service 224 may automatically connect the user 210a-n to his or her default virtual room. For example, the connection management service 224 may retrieve, from the database(s) 113, data indicative of an identification number (ID) associated with the default virtual room associated with the user 210a-n. For example, the connection management service 224 may retrieve, from the room database(s) 232, the data indicative of an identification number (ID) associated with the default virtual room associated with the user 210a-n. The connection management service 224 may utilize said data to connect the user 210a-n to the user's default virtual room. After connecting a user to the default virtual room, the connection management service 224 may store, in the database(s) 113, such as the room database(s) 232, data indicating that that particular user has joined the default virtual room and/or at what time that particular user joined the default virtual room.

In embodiments, if the user wants to enter a virtual room different from his or her virtual room, the connection management service 224 may receive, from a user 210a-n, data indicative of a request to join a different virtual room. The connection management service 224 may retrieve, from the database(s) 113, such as the room database(s) 232, data indicative of an identification number (ID) associated with the virtual room that the user 210a-n wants to associate with. The connection management service 224 may utilize said data to connect the user 210a-n to the virtual room that the user has requested to be connected with. After connecting a user to the different virtual room, the connection management service 224 may store, in the database(s) 113, such as in the room database(s) 232, data indicating that that particular user has joined that different virtual room and/or at what time that particular user joined that particular virtual room.

If the user has requested to join a virtual room that the user needs permission to join, the connection management service 224 can retrieve, from the database(s) 113, such as the room database(s) 232, data indicating whether or not the user has permission to join that particular virtual room. If the user does have permission, the connection management service 224 may connect the user 210a-n to the virtual room that the user has requested to be connected with. Conversely, if the user does not have permission, the connection management service 224 may not connect the user 210a-n to the virtual room that the user has requested to be connected with.

In embodiments, all of the users that are located in a particular virtual room may communicate asynchronously with each other via the communication service 112. For example, the users 210a-n may text message and/or instant message each other and/or may post comments related to content previously shared by other users. The communication management service 226 facilitates such asynchronous communication amongst users 210a-n. For example, the communication management service 226 may initiate a communication channel between two users via a chat service 222 so that they may participate in asynchronous communication with each other. The communication channel may be initiated, for example, within the virtual room that the two users are in. For example, the communication management service 226 may initiate a communication channel between two users via the chat service 222 in response to receiving a request to start a chat. The chat service 222 may be a device and/or a program running on a device of the communication service 112.

The chat service 222 may be configured to receive inputs from users 210. The user inputs may include text messages and/or instant messages. Participants of an asynchronous communication may comprise any users 210a-n who are allowed to participate in the asynchronous communication in any manner. The chat service 222 may manage the asynchronous communication. For instance, the chat service 222 may categorize the conversations. The chat service 222 may store the conversations, any associations with the conversation, and/or conversation metadata in the database(s) 113, such as in a chat database 256. The chat service 222 may update, in the database(s) 113, the data when a new asynchronous communication between the users 210a-n occurs.

In an embodiment, any or all of the users that are located in a particular virtual room may communicate synchronously with each other via the communication service 112. For example, the users 210a-n may video and/or audio conference with each other. The communication management service 226 facilitates such synchronous communication amongst users 210a-n. For example, the communication management service 226 may initiate a communication channel between two users via a video/audio conference service 253 so that they may participate in synchronous communication with each other. The communication channel may be initiated, for example, within the virtual room that the two users are in. For example, the communication management service 226 may initiate a communication channel via the video/audio conference service 253 between two users via the video/audio conference service 253 in response to receiving a request to start a video/audio conference. The video/audio conference service 253 may be a device and/or a program running on a device of the communication service 112.

The video/audio conference service 253 may be configured to receive inputs from users 210. The user inputs may include live video and/or audio feed. Participants of a synchronous communication may comprise any users 210a-n who are allowed to participate in the synchronous communication in any manner. The video/audio conference service 253 may manage the synchronous communication. For instance, the video/audio conference service 253 may categorize the conversations. The video/audio conference service 253 may store the conversations, any associations with the conversation, and/or conversation metadata in the database(s) 113, such as in a database 236. The video/audio conference service 253 may update, in the database(s) 113, the data when a new synchronous communication between the users 210a-n occurs.

In embodiments, the users that have joined a particular virtual room may all want to participate in a live, synchronous communication with one another. However, in some instances, only a portion (e.g., subset) of the users that have been connected to a particular virtual room may want to participate in a live, synchronous communication with one another. For example, if three people are in a virtual room, two of the users may want to have a real-time communication with one another, without the third user. The two users may do so by participating in a live bubble chat. The two users may participate in real-time communication inside of the bubble. The bubble may include a communication channel that is not accessible to the third user that is not in the bubble. However, despite only the two users being in the bubble, they are still in the same virtual room as the third user. Therefore, all three users still may communicate via the communication channel associated with that virtual room. The communication channel associated with the bubble chat may be a sub-channel of the communication channel associated with the virtual room.

In embodiments, a user 210a-n may turn on a collaborative mode in a particular virtual room in order to participate in impromptu real-time communication with other users in the same virtual room. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

In embodiments, collaborative mode may, by default, by disabled or turned-off whenever a user 210a-n enters a new room. For example, when the user 210a-n is automatically placed in his or her default room when he or she opens the application 240, collaborative mode for that user may be, by default, disabled. If the user 210a-n wants to enable collaborative mode in his or her default room, the user 210a-n may need to manually toggle an interface element indicating that collaborative mode should be enabled. Likewise, each time a user 210a-n enters a different virtual room, collaborative mode may, by default, by disabled or turned-off in each new virtual room, regardless of whether the user 210a-n had collaborative mode enabled in the previous virtual room. If the user 210a-n wants to enable collaborative mode in a virtual room other than his or her default room, the user 210a-n may need to manually toggle an interface element indicating that collaborative mode should be enabled.

In embodiments, if collaborative mode is enabled, such as by the user 210a-n, a microphone and/or camera of the computing device may automatically be muted/turned off. If the microphone is muted, the other users that are also in collaborative mode in that same virtual room may not be able to hear the user speaking to them. However, the user may still be able to hear the other users in collaborative mode that have their microphones unmuted. Likewise, if the camera is turned off, the other users that are also in collaborative mode in that same virtual room may not be able to view the user. However, the user may still be able to see the other users in collaborative mode that have their camera turned on.

In embodiments, the user 210a-n may manually toggle an interface element to unmute his or her microphone and/or turn on his or her camera. If the user manually toggles an interface element to unmute his or her microphone, the other users that are also in collaborative mode in that same virtual room may be able to hear the user speaking to them. If the user manually toggles an interface element to turn on his or her camera, the other users that are also in collaborative mode in that same virtual room may also be able to see the user. The user can re-mute his or her microphone and/or turn the camera back off at any time.

Figure 8:
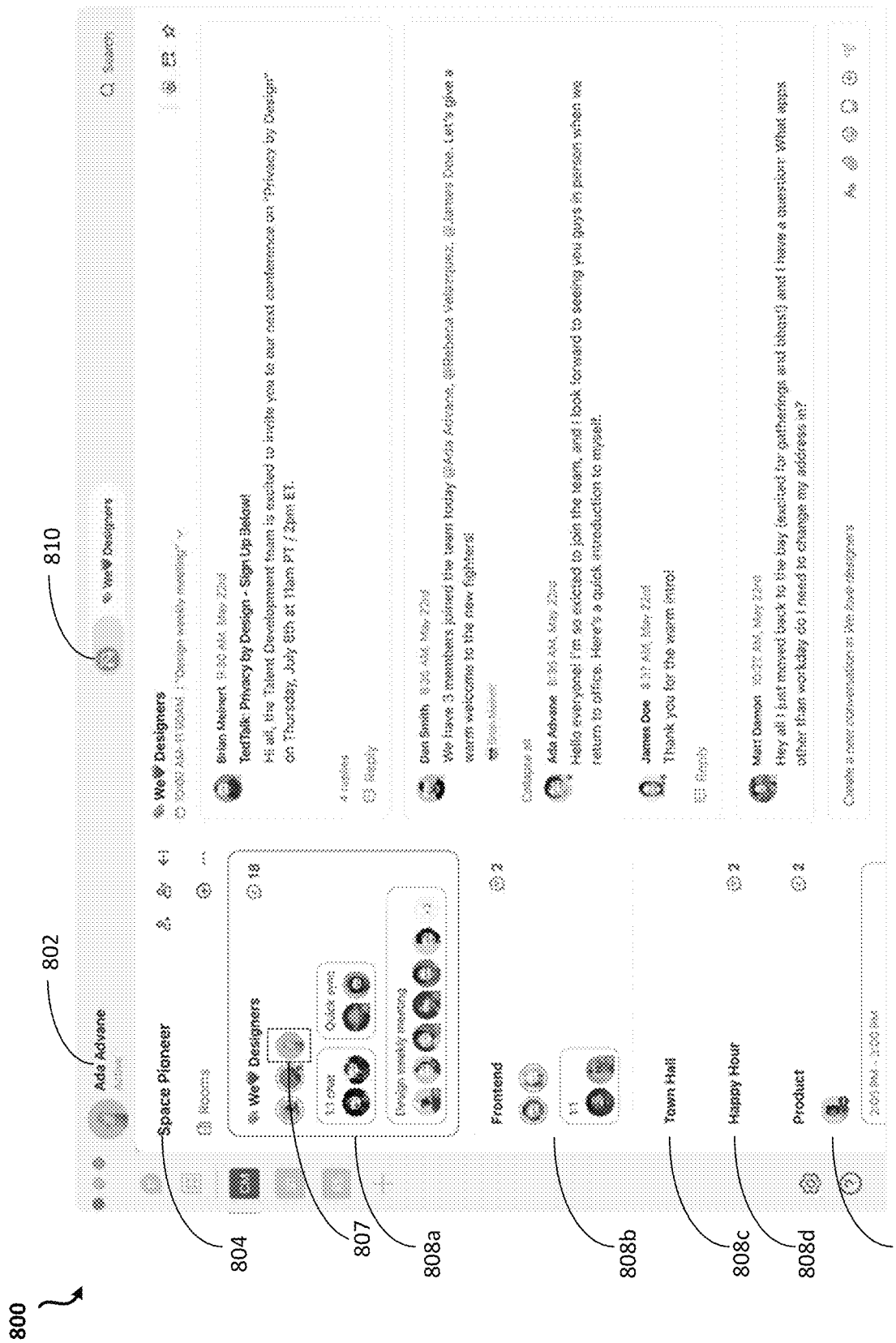
FIG. 8 shows an example user interface for facilitating communication in accordance with the present disclosure.

FIG. 8 illustrates an example UI 800 of an application (e.g., application 240) depicting a plurality of representations of virtual rooms 808a-e provided by a communication service (e.g., communication service 112). The UI 800 may, for example, be displayed on a user device belonging to a user 210a-n associated with the user information 802. The user information 802 indicates one or more of a name, a status/availability, and an avatar (e.g., icon, profile picture) of the user.

In embodiments, representations of the virtual rooms 808a-e are displayed on the UI 800. For example, the virtual rooms may each be represented by a particular card. The representations of the virtual rooms 808a-e may each correspond to a single workspace. For example, the virtual rooms corresponding to the representations 808a-e may all belong to the workspace 804. A user may select any one of the representations of the virtual rooms 808a-e to join or become associated with the corresponding virtual room. For example, the user may see that one of the representations of the virtual rooms 808a-e corresponds to a virtual room that has a name that is of interest to the user, and/or the user may see, via the representations of the virtual rooms 808a-e, that a person of interest is in one of the virtual rooms. The user may select that representation 808a-e, such as by clicking on that representation. For example, the user may select the representation 808a to enter the virtual room corresponding to the representation 808a. The virtual room corresponding to the representation 808a may be of interest to the user for any number of reasons. For example, the virtual room may be associated with subject matter that is of interest to the user or other users that are of interest to the user may already be in the virtual room. If the user selects the representation 808a, the user may join or become associated with the virtual room corresponding to the representation 808a.

As discussed above, in some embodiments, the users 210a-n do not need permission to join any of the virtual rooms. Instead, the users 210a-n may freely join and leave the virtual rooms. In some embodiments, the virtual rooms corresponding to the representations 808a-e may all public virtual rooms, meaning that the users 210a-n do not need permission to join any of the virtual rooms corresponding to the representations 808a-e. However, it should be appreciated that in other embodiments, one or more of the virtual rooms may be private virtual rooms. A private virtual room may be a virtual room that has restrictions on which users may view and/or join the virtual room. For example, a private virtual room may be restricted to those users who are participating in a particular meeting. A public virtual room may be changed to a private virtual room, and vice versa.

In embodiments, each of the users 210a-n of the communication service may be associated with an avatar (e.g., icon, profile picture, etc.). When a user opens the application associated with the communication service, that user's avatar may appear in the virtual room that the user is located in. For example, the virtual room corresponding to the representation 808a may be the default virtual room for the user corresponding to the user information 802. Thus, when the user corresponding to the user information 802 first opens the application, the avatar 807 of the user corresponding to the user information 802 may automatically be placed in the representation 808a. If the user corresponding to the user information 802 later switches virtual rooms, the avatar 807 may disappear from the representation 808a and may instead be located in a different representation 808b-e corresponding to the user's current virtual room. Likewise, the avatars of the other users that are currently using the application may be located in the representation corresponding to the appropriate virtual room. As shown in the example of FIG. 8, when the user corresponding to the user information 802 first enters a virtual room (default or otherwise), that user may automatically have collaborative mode disabled. For example, an interface element 810 is in a first (e.g., un-toggled) position, indicating that collaborative mode is disabled.

Figure 9:
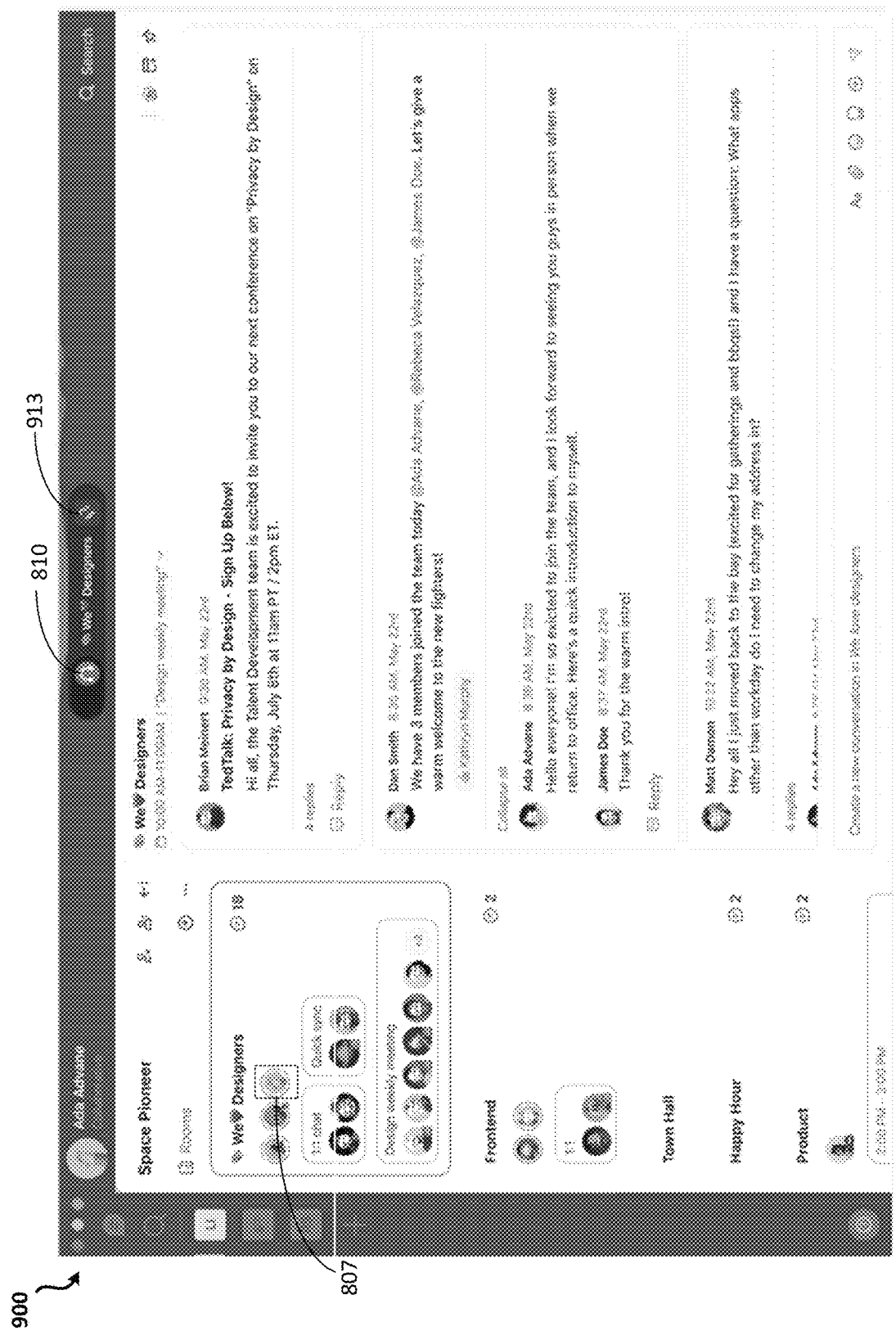
FIG. 9 shows another example user interface for facilitating communication in accordance with the present disclosure.

As discussed above, if the user 210a-n wants to enable collaborative mode, the user 210a-n may need to manually toggle the interface element 810 indicating that collaborative mode should be enabled. FIG. 9 illustrates an example UI 900 of the application depicting the interface element 810 in a second (e.g., toggled) position. To toggle the interface element 810, the user may simply click or select the interface element 810, such as with a mouse, keyboard, stylus, or finger. If the interface element 810 is toggled, a visual element may be added to the user's avatar 807. The visual element may be visible to other users of the communication service. For example, in the example of FIG. 9, a ring has been added around the avatar 807. However, it should be appreciated that in other embodiments, the visual element may be a shape other than a ring. The visual element may have a predetermined shape and/or a predetermined color. Adding the visual element to the user's avatar 807 may indicate to other users that the user corresponding to the user information 802 is available for a real-time communication, such as an impromptu audio or video meeting, with other users. Once the interface element 810 is toggled, the user may click or select the interface element 810 again to return the interface element 810 to its first, untoggled position.

If collaborative mode is enabled, such as by the user corresponding to the user information 802, a microphone and/or camera of the computing device may automatically be muted/turned off. The UI 900 of the application depicts the interface element 913 in a first (e.g., un-toggled) position indicating that the user's microphone is muted and/or camera is turned off. If the microphone is muted, the other users that are also in collaborative mode in the virtual room corresponding to the representation 808a may not be able to hear the user corresponding to the user information 802 speaking to them. However, the user corresponding to the user information 802 may still be able to hear the other users in collaborative mode that have their microphones unmuted. Likewise, if the camera is turned off, the other users that are also in collaborative mode in the virtual room corresponding to the representation 808a may not be able to view the user corresponding to the user information 802. However, the user corresponding to the user information 802 may still be able to see the other users in collaborative mode that have their camera turned on.

Figure 10:
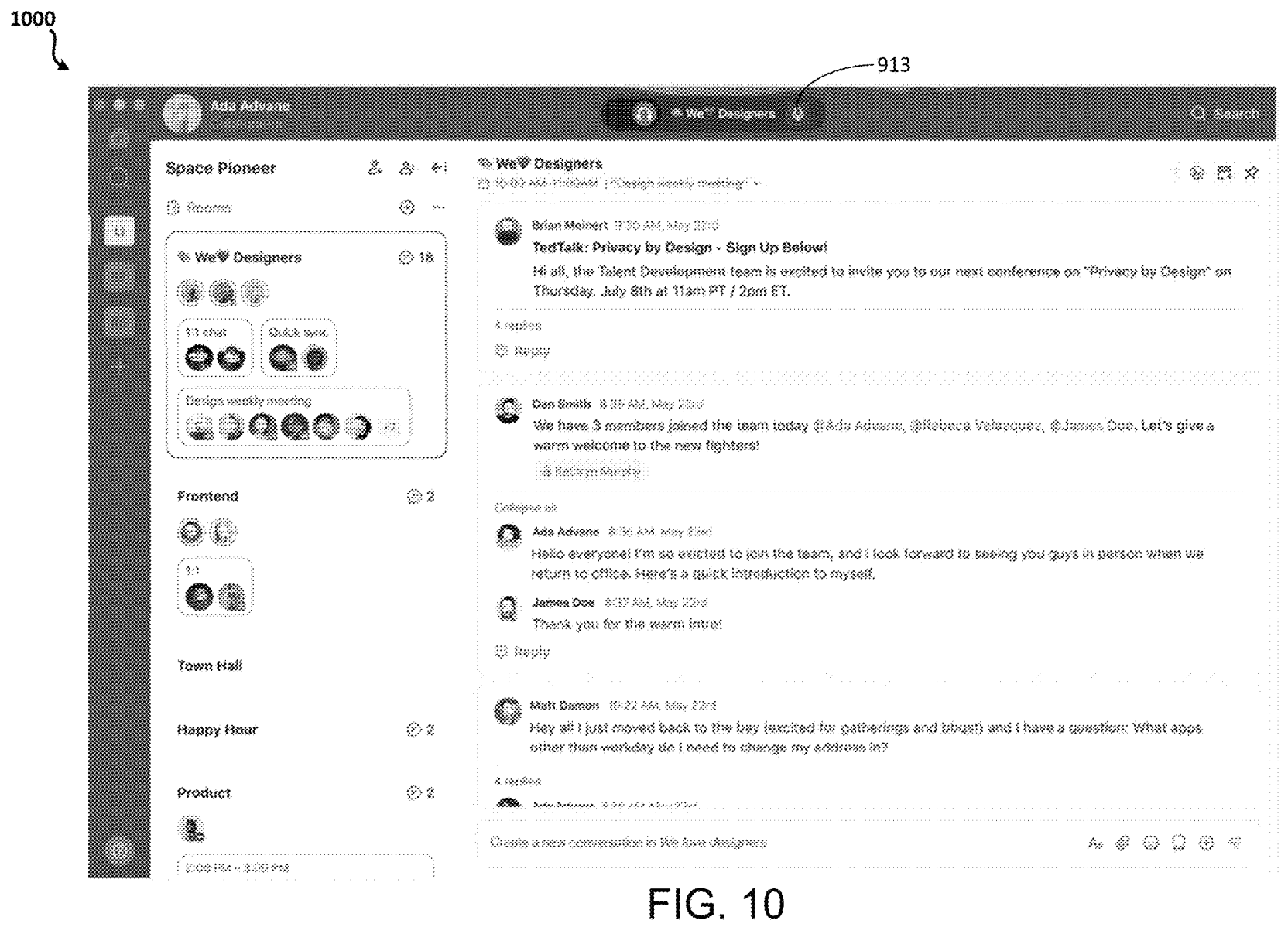

As discussed above, if the user corresponding to the user information 802 wants to enable collaborative mode, the user 210*a-n* may need to manually toggle the interface element 913 indicating that the microphone should be unmuted and/or the camera should be turned on. FIG. 10 illustrates an example UI 1000 of the application depicting the interface element 913 in a second (e.g., toggled) position. To toggle the interface element 913, the user may simply click or select the interface element 913, such as with a mouse, keyboard, stylus, or finger. If the interface element 913 is toggled, the visual element 913 may transform, such as from a muted microphone to an unmuted microphone. If the user corresponding to the user information 802 manually toggles the interface element 913 to unmute his or her microphone, the other users that are also in collaborative mode in that same virtual room may be able to hear the user corresponding to the user information 802 speaking to them. If the user corresponding to the user information 802 manually toggles the interface element 913 to turn on his or her camera, the other users that are also in collaborative mode in that same virtual room may also be able to see the user corresponding to the user information 802. The user corresponding to the user information 802 can re-mute his or her microphone and/or turn the camera back off at any time, such as by re-toggling the interface element 913.

As discussed above, existing internet-based communication tools do not adequately replace in-person communication and collaboration. For example, when two or more people are in the same physical building or room as each other, they can engage in frequent impromptu (e.g., spontaneous, unplanned, etc.) conversation with each other. In the workplace, such impromptu real-time communication may facilitate collaboration, productivity, efficiency, and a sense of community amongst co-workers. By allowing users to turn collaboration mode on and off within a virtual room, the communication service 112 described herein more closely simulates in-person communication, and thus provides the benefits of in-person communication and collaboration.

Referring back to FIG. 2, in embodiments, a user may, before or after enabling collaborative mode in a particular virtual room, want to participate in a live bubble chat. If the user wants to participate in a live bubble chat (e.g., wants to communicate in a sub-channel of the communication channel associated with the virtual room), the user may enter the live bubble chat. If the user had collaborative mode enabled when the user entered into the live bubble chat, collaborative mode may be automatically disabled or turned off for that user. If the user did not have collaborative mode enabled when the user entered into the live bubble chat, no change may be made to the user's collaborative mode status (i.e., it will remain disabled).

Figure 11:
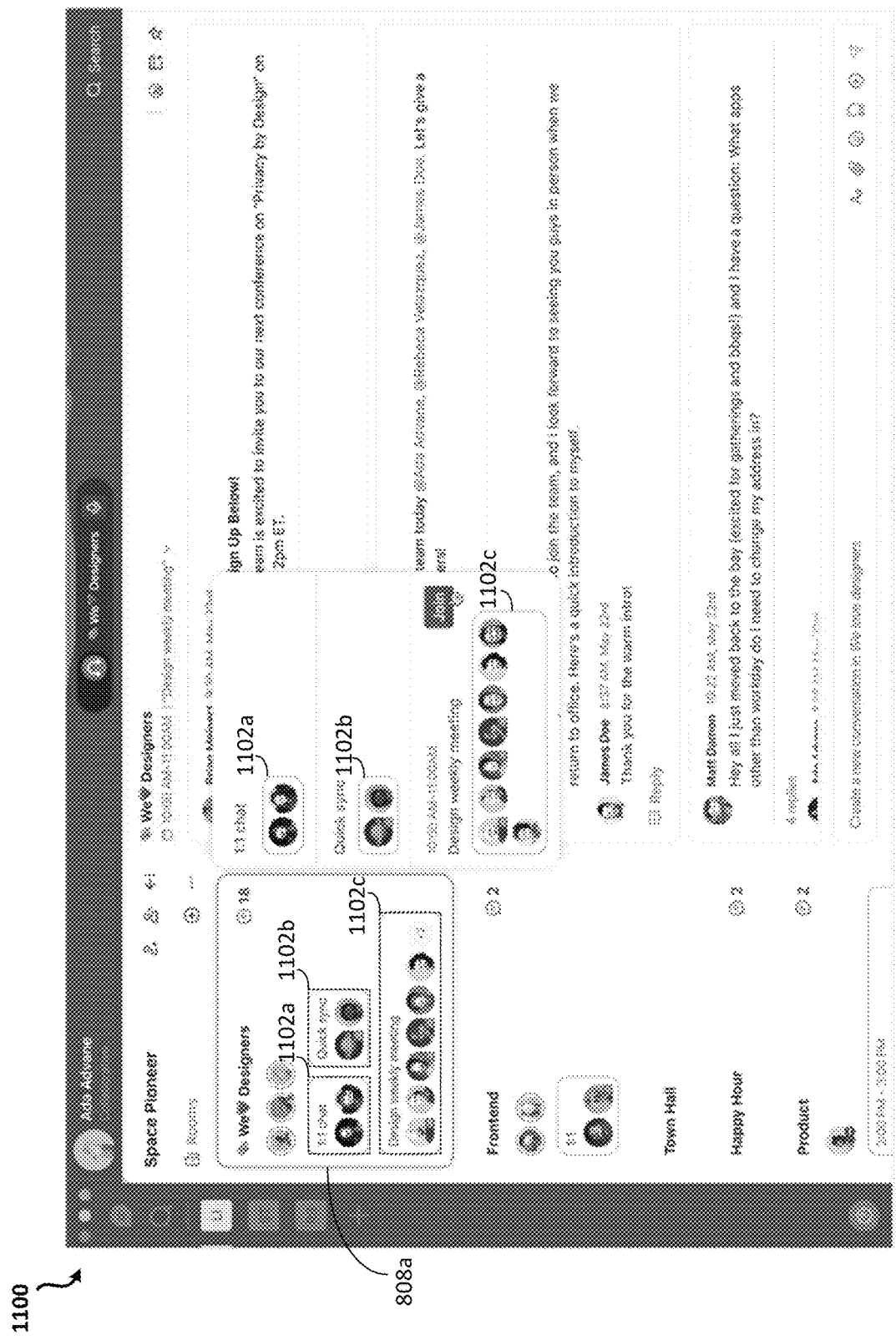
FIG. 11 shows another example user interface for facilitating communication in accordance with the present disclosure.

FIG. 11 illustrates an example UI 1100 of the application depicting a user entering a bubble chat in a virtual room. The virtual room corresponding to the representation 808*a* includes three bubble chats 1102*a-c*. However, in other embodiments, it should be appreciated that fewer than three or more than three bubble chats may be occurring in a single virtual room. A user, such as the user corresponding to the user information 802 may want to enter a private bubble chat. For example, the user corresponding to the user information 802 may want to participate in a live, synchronous communication with a subset of users in the virtual room.

In embodiments, to enter into a bubble chat in a virtual room, the user may hover over the representation corresponding to the virtual room. For example, the user corresponding to the user information 802 may hover over the representation 808*a* to join one of the bubble chats 1102*a-c*. The user may select an "enter" or "join" button next to the bubble chat that the user wants to join. For example, to join the bubble chat 1102*c*, the user may select the "join" button next to the bubble chat 1102*c*. In embodiments, if user corresponding to the user information 802 had collaborative mode enabled when the user entered into the bubble chat 1102*c*, collaborative mode may be automatically disabled or turned off when the user enters into the bubble chat 1102*c*. If the user did not have collaborative mode enabled when the user entered into the bubble chat 1102*c*, no change may be made to the user's collaborative mode status (i.e., it will remain disabled).

Figure 12:
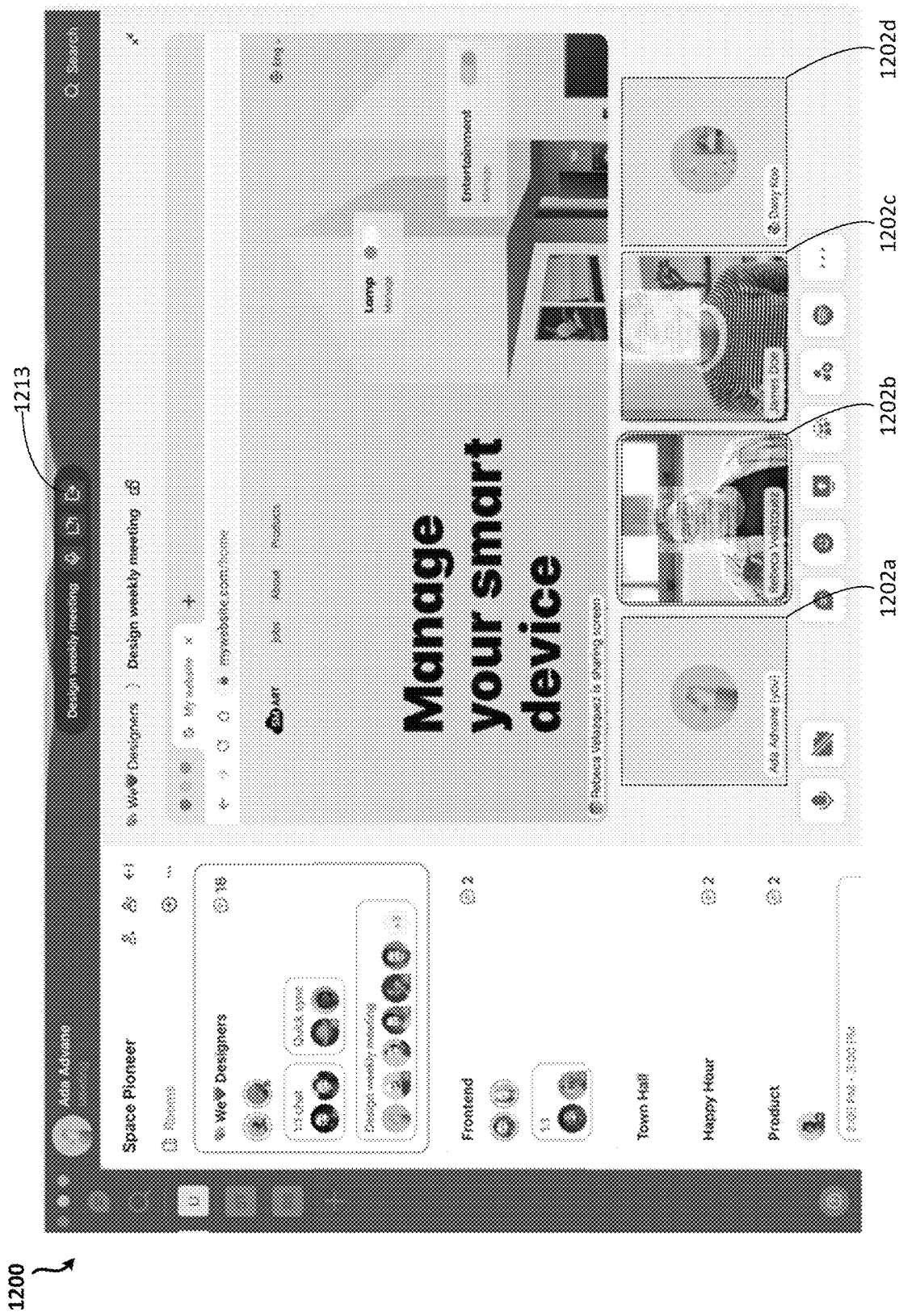
FIG. 12 shows another example user interface for facilitating communication in accordance with the present disclosure.

The bubble chat 1102*c* may include a communication channel that is not accessible to users in the same virtual room that are not in the bubble chat 1102*c*. The communication channel associated with the bubble chat 1102*c* may be a sub-channel of the communication channel associated with the virtual room. FIG. 12 illustrates an example UI 1200 of the application depicting a bubble chat, such as the bubble chat 1102*c*. Each user present in the bubble chat may be represented by an icon 1202*a-d*. For example, the user corresponding to the user information 802 may correspond to the icon 1202*a*. Each user in the bubble chat may have his or her microphone muted or unmuted. Those users that have their microphone unmuted may be able to speak and be heard in real-time by the other users in the bubble chat. Likewise, each user in the bubble chat may have his or her camera turned on or off. Those users that have their camera turned on may be able to be viewed in real-time by the other users in the bubble chat. For example, the icons 1202*a-d* of those users that have their camera turned on may display a live video feed of the corresponding user. The icons 1202*a-d* of those users that do not have their camera turned on may instead display the avatar of the corresponding user. To exit the bubble chat, the user may select the button 1213.

Referring back to FIG. 2, in some embodiments, the virtual room is more than a mechanism to facilitate real-time communications such as video conference, rather it can function as a repository of information and communications related to a particular topic and provide a history of the development of ideas. For example, the virtual room may store the entire history of all of the forms of communication that occurred in the virtual room, including text messages, videos, documents, uniform resource locator exchanges, and so on.

In embodiments, the user management service 225 may store, in the database(s) 113, data indicative of bubble chats. For example, the user management service 225 may store, in the bubble chat database(s) 237, data indicative of current ongoing and/or previous live bubble chats. The data may indicate the users that participated in each bubble chat, the duration of each bubble chat, the virtual room that each bubble chat occurred in, and/or any other relevant data related to the bubble chats. The user management service 225 may update/modify such data if/when a new live bubble chat is created.

In embodiments, the user management service 225 may store, in the database(s) 113, data indicative of the collaborative mode status of each user 210*a-n*. For example, the user management service 225 may store, in the database(s) 234, data indicative of the collaborative mode status of each user 210*a-n*. The user management service 225 may update/ modify such data if/when a user changes his or her collaborative mode status. Additionally, or alternatively, the user management service 225 may update/modify such data if/when the user management service 225 automatically updates a user's collaborative mode status, such as when a user enters a bubble chat and collaborative mode is automatically disabled. Likewise, the user management service 225 may store, in the user status database 234, data indicative of the time period associated with the collaborative mode status of each user 210*a-n*.

In embodiments, the user management service 225 may store, in the database(s) 113, data indicative of user location (e.g., which virtual room each user 210*a-n* is currently in and/or which virtual room(s) each user 210*a-n* has previously been located in. For example, the user management service 225 may store, in a user location database 252, data indicative of the location of each user 210*a-n*. The user management service 225 may update/modify, in the user location database 252, the data indicative of the location of each user 210*a-n* when the user's location changes (e.g., the user leaves a virtual room, such as a default virtual room, and/or joins a different virtual room, etc.).

In embodiments, users may be able to participate in non-real time communication (but not real-time communication) within a virtual room without entering the virtual room. For example, while a user is located in a first virtual room, the user may be able to view an asynchronous text chat located in a different virtual room. In some embodiments, the user may be able to send messages in the asynchronous text chat located in the different virtual room without entering the different virtual room. However, the user may need to enter the different virtual room if the user wants to participate in real-time communication, such as a bubble chat or an impromptu audio or video meeting in the different virtual room.

Figure 13:
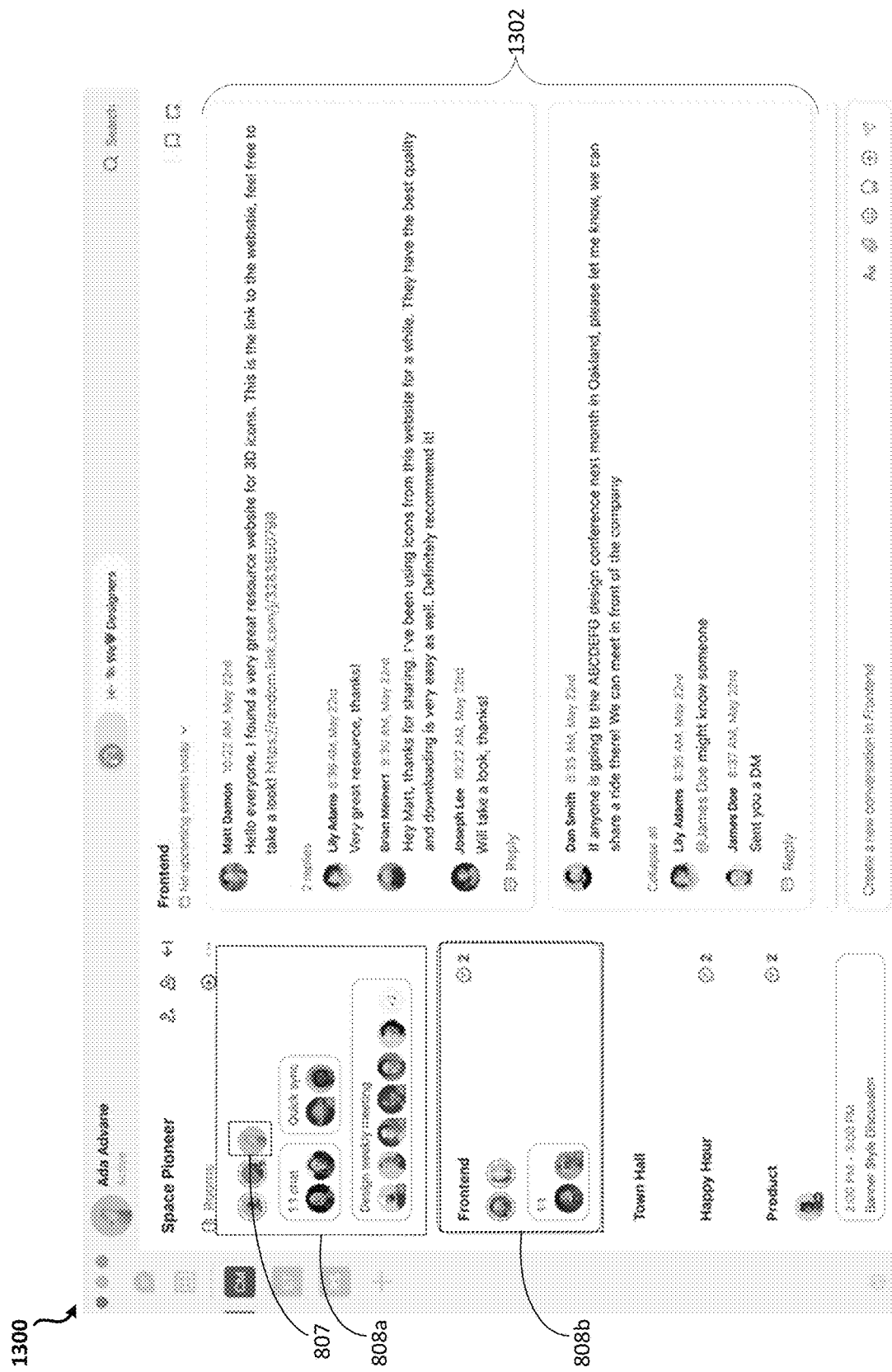
FIG. 13 shows another example user interface for facilitating communication in accordance with the present disclosure.

FIG. 13 illustrates an example UI 1300 of the application depicting a user located in a first virtual room participating in an asynchronous text chat associated with a different virtual room. For example, a user may be located in the virtual room corresponding to the representation 808*a*. The user's avatar 807 may be located in the representation 808*a*. For various reasons, the user corresponding to the user information 802 may want to participate in an asynchronous text chat 1302 occurring in a different virtual room, such as the virtual room corresponding to the representation 808*b*. To view the asynchronous text chat 1302 occurring in the virtual room corresponding to the representation 808*b*, the user may click on the representation 808*b* without entering the virtual room corresponding to the representation 808*b*. In some embodiments, in addition to being able to view the asynchronous text chat 1302, the user may be able to send new messages to the asynchronous text chat 1302 without entering the virtual room corresponding to the representation 808*b*.

Figure 14:
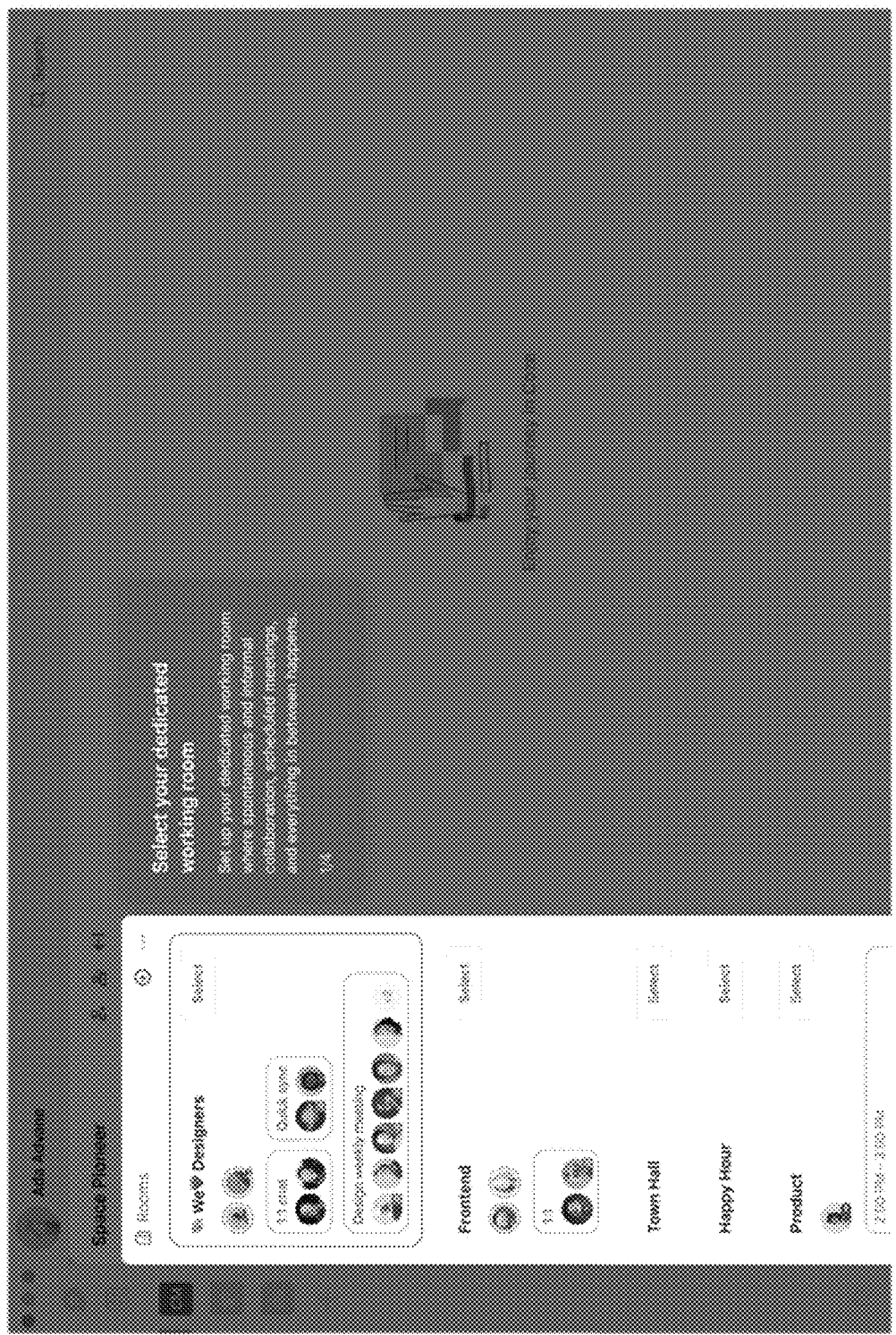
FIG. 14 shows another example user interface for facilitating communication in accordance with the present disclosure.
Figure 15:
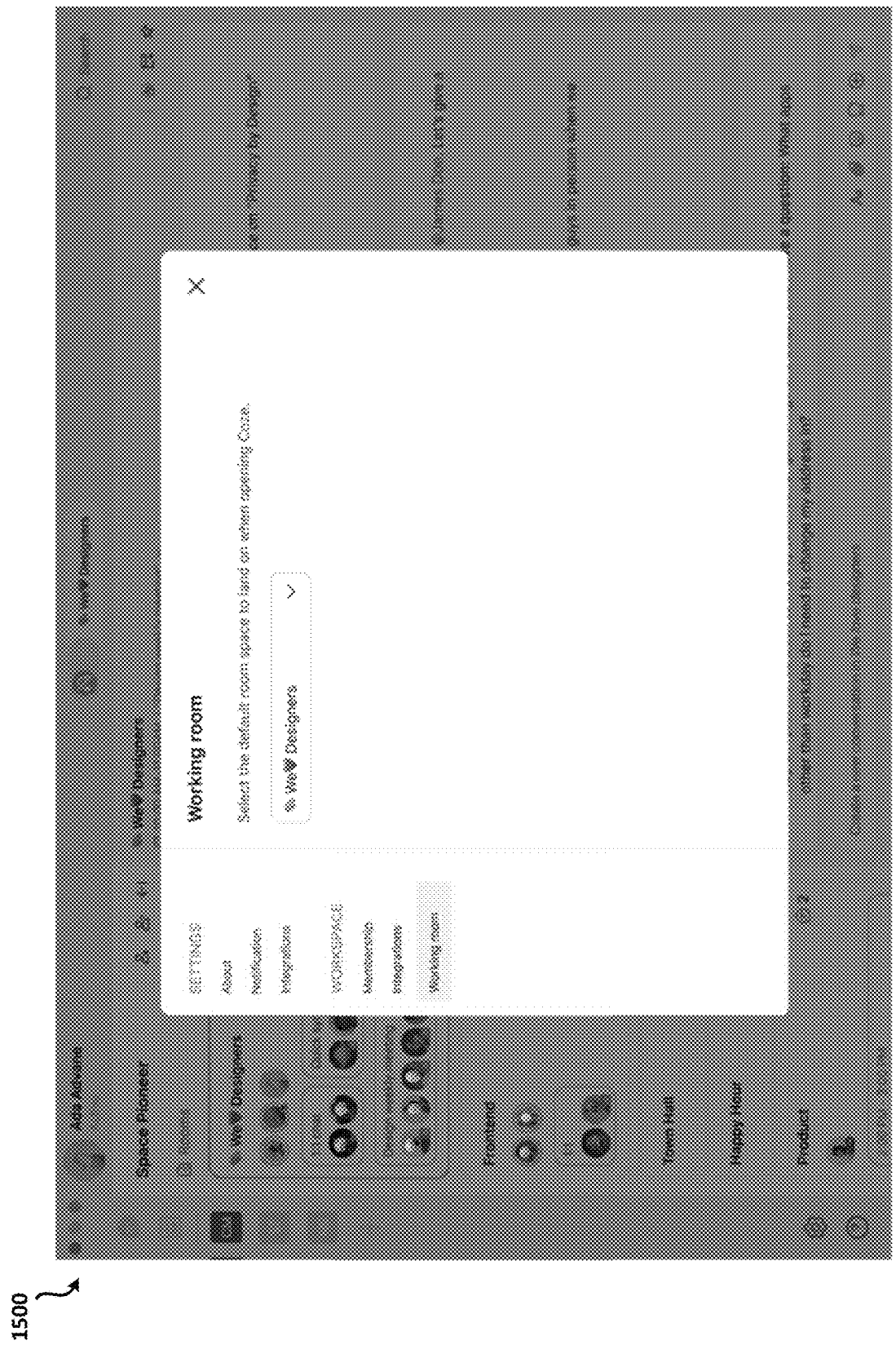
FIG. 15 shows another example user interface for facilitating communication in accordance with the present disclosure.
Figure 16:
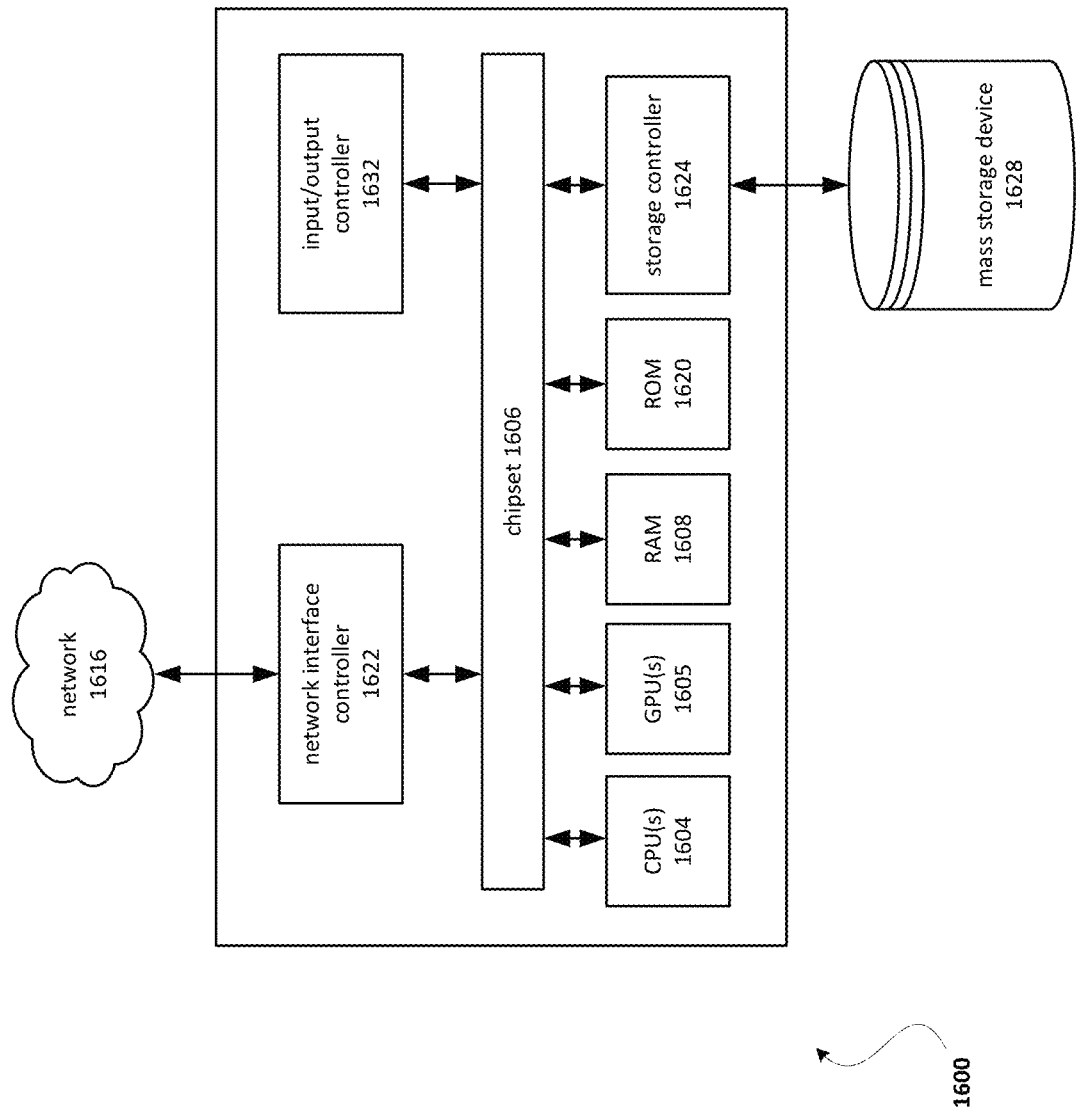
FIG. 16 shows an example computing device which may be used to perform any of the techniques disclosed herein.

Referring back to FIG. 2, as discussed above, a user's default virtual room may be, in some instances, selected by the users 210*a-n* themselves. For example, a user 210*a* may select a virtual room that he or she spends most of her time in as that user's default virtual room. As another example, a user 210*b* may select a virtual room that is associated with a topic of highest interest to the user as that user's default room. FIG. 14 illustrates an example UI 1400 of a user selecting his or her own default virtual room. The UI 1400 shows a user selecting his or her own default virtual room during an onboarding process associated with the application 240. For example, the user may select his or her own default virtual room before the user actually begins using the application 240 to communicate with others. FIG. 15 illustrates another example UI 1500 of a user selecting his or her own default virtual room. The UI 1500 shows a user selecting his or her own default virtual room from a settings screen associated with the application 240. For example, the user may select or change his or her own default virtual room after the user has already begun using the application 240 to communicate with others.

It should be appreciated that the communication service 112 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

Figure 3:
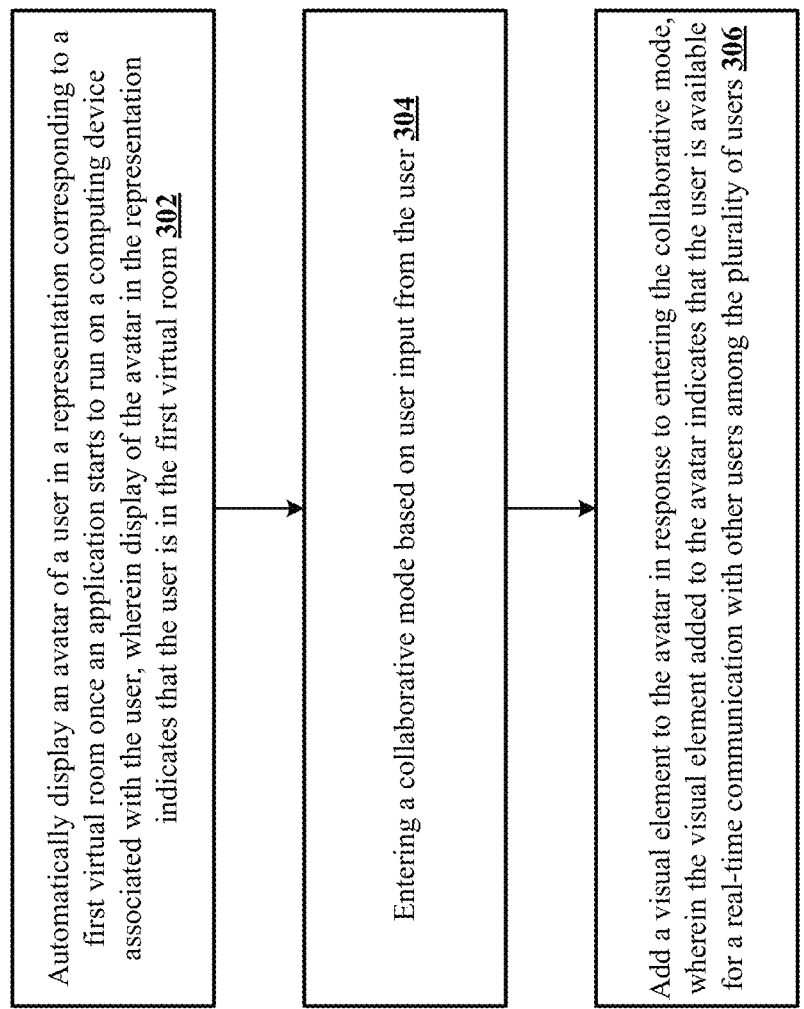
FIG. 3 shows an example process for facilitating communication, which may be performed by a communication system in accordance with the present disclosure.

FIG. 3 illustrates an example process 300 for facilitating communication, which may be performed by a communication service (e.g., communication service 112) in accordance with the present disclosure. For example, the process 300 may be utilized to facilitate collaboration in a work environment. Although depicted as a sequence of operations in FIG. 3, those of ordinary skill in the art will appreciate that various embodiments may add, remove, reorder, or modify the depicted operations.

As discussed above, a user of the communication service may automatically be located in a default virtual room once an application (e.g., application 240 of FIG. 2) associated with the communication service starts to run on a computing device associated with the user. The default virtual room may be, in some instances, selected by the user. For example, a user may select a virtual room that he or she spends most of her time in as that user's default virtual room. As another example, a user may select a virtual room that is associated with a topic of highest interest to the user as that user's default room. The default virtual room for a particular user may, in some instances, be selected by the communication service. For example, the communication service may automatically select a virtual room for a particular user based on that user's behaviors or preferences, such as which virtual rooms that user visits, for how long the user visits those rooms, and which projects or topics are of interest to the user. In some embodiments, the default virtual room for a particular user may be selected by that user's colleague, such as that user's boss or superior.

In one or more embodiments, a user of the communication service may open the application associated with the communication service and may be automatically located in that user's default virtual room (e.g., first virtual room). At 302, an avatar of a user may be automatically displayed in a representation corresponding to the first virtual room once the application starts to run on a computing device associated with the user. Display of the avatar in the representation may indicate that the user is in the first virtual room. For example, as described above with regard to FIG. 8, the user corresponding to the user information 802 may be associated with an avatar 807. The avatar 807 may be displayed in the default virtual room of the user corresponding to the user information 802 once the application starts to run on a computing device associated with the user.

The user may turn on a collaborative mode in the first virtual room in order to participate in impromptu real-time communication with other users in the first virtual room. At 304, a collaborative mode may be entered based on user input from the user. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

If the user enters collaborative mode, a visual element may be automatically added to the user's avatar. At 306, a visual element may be added to the avatar in response to entering the collaborative mode. The visual element added to the avatar may indicate that the user is available for a real-time communication with other users among the plurality of users. The visual element may be visible to other users of the communication service. The visual element may have a predetermined shape and/or a predetermined color. Adding the visual element to the user's avatar may indicate to other users that the user is available for a real-time communication, such as an impromptu audio or video meeting, with other users.

FIG. 4 illustrates an example process 400 for facilitating communication, which may be performed by a communication service (e.g., communication service 112) in accordance with the present disclosure. For example, the process 400 may be utilized to facilitate collaboration in a work environment. Although depicted as a sequence of operations in FIG. 4, those of ordinary skill in the art will appreciate that various embodiments may add, remove, reorder, or modify the depicted operations.

As discussed above, a user of the communication service may automatically be located in a default virtual room once an application (e.g., application 240 of FIG. 2) associated with the communication service starts to run on a computing device associated with the user. The default virtual room may be, in some instances, selected by the user. For example, a user may select a virtual room that he or she spends most of her time in as that user's default virtual room. As another example, a user may select a virtual room that is associated with a topic of highest interest to the user as that user's default room. The default virtual room for a particular user may, in some instances, be selected by the communication service. For example, the communication service may automatically select a virtual room for a particular user based on that user's behaviors or preferences, such as which virtual rooms that user visits, for how long the user visits those rooms, and which projects or topics are of interest to the user. In some embodiments, the default virtual room for a particular user may be selected by that user's colleague, such as that user's boss or superior.

In one or more embodiments, a user of the communication service may open the application associated with the communication service and may be automatically located in that user's default virtual room (e.g., first virtual room). At 402, an avatar of a user may be automatically displayed in a representation corresponding to the first virtual room once the application starts to run on a computing device associated with the user. Display of the avatar in the representation may indicate that the user is in the first virtual room. For example, as described above with regard to FIG. 8, the user corresponding to the user information 802 may be associated with an avatar 807. The avatar 807 may be displayed in the default virtual room of the user corresponding to the user information 802 once the application starts to run on a computing device associated with the user.

The user may turn on a collaborative mode in the first virtual room in order to participate in impromptu real-time communication with other users in the first virtual room. At 404, a collaborative mode may be entered based on user input from the user via an interface element. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

In embodiments, collaborative mode may, by default, by disabled or turned-off whenever the user enters the first virtual room. If the user wants to enable collaborative mode in the first virtual room, the user may need to manually toggle an interface element indicating that collaborative mode should be enabled. For example, the user may toggle the interface element 810 described above with regard to FIGS. 8-9 in order to enter collaborative mode.

If the user toggles the interface element indicating that collaborative mode should be enabled, a visual element may be automatically added to the user's avatar. At 406, a visual element may be added to the avatar in response to entering the collaborative mode. The visual element added to the avatar may indicate that the user is available for a real-time communication with other users among the plurality of users. The visual element may be visible to other users of the communication service. The visual element may have a predetermined shape and/or a predetermined color. Adding the visual element to the user's avatar may indicate to other users that the user is available for a real-time communication, such as an impromptu audio or video meeting, with other users.

If a user has entered collaborative mode, this may indicate that the user is interested in participating in impromptu video and/or audio conferencing with other users in the first virtual room. All users in the first virtual room that have enabled the collaborative mode may automatically be added to a live video and/or audio conference with each other. At 408, the real-time communication may be initiated with any other user among the plurality of users whose avatar indicates that the other user is available for a real-time communication. In some embodiments, only a subset of the users located in the first virtual room will have enabled collaborative mode. In such instances, those users that have not enabled collaborative mode will not be added to the live video and/or audio chat with the users that have enabled collaborative mode.

FIG. 5 illustrates an example process 500 for facilitating communication, which may be performed by a communication service (e.g., communication service 112) in accordance with the present disclosure. For example, the process 500 may be utilized to facilitate collaboration in a work environment. Although depicted as a sequence of operations in FIG. 5, those of ordinary skill in the art will appreciate that various embodiments may add, remove, reorder, or modify the depicted operations.

As discussed above, a user of the communication service may automatically be located in a default virtual room once an application (e.g., application 240 of FIG. 2) associated with the communication service starts to run on a computing device associated with the user. The default virtual room may be, in some instances, selected by the user. For example, a user may select a virtual room that he or she spends most of her time in as that user's default virtual room. As another example, a user may select a virtual room that is associated with a topic of highest interest to the user as that user's default room. The default virtual room for a particular user may, in some instances, be selected by the communication service. For example, the communication service may automatically select a virtual room for a particular user based on that user's behaviors or preferences, such as which virtual rooms that user visits, for how long the user visits those rooms, and which projects or topics are of interest to the user. In some embodiments, the default virtual room for a particular user may be selected by that user's colleague, such as that user's boss or superior.

In one or more embodiments, a user of the communication service may open the application associated with the communication service and may be automatically located in that user's default virtual room (e.g., first virtual room). At 502, an avatar of a user may be automatically displayed in a representation corresponding to the first virtual room once the application starts to run on a computing device associated with the user. Display of the avatar in the representation may indicate that the user is in the first virtual room. For example, as described above with regard to FIG. 8, the user corresponding to the user information 802 may be associated with an avatar 807. The avatar 807 may be displayed in the default virtual room of the user corresponding to the user information 802 once the application starts to run on a computing device associated with the user.

The user may turn on a collaborative mode in the first virtual room in order to participate in impromptu real-time communication with other users in the first virtual room. At 504, a collaborative mode may be entered based on user input from the user via an interface element. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

In embodiments, collaborative mode may, by default, by disabled or turned-off whenever the user enters the first virtual room. If the user wants to enable collaborative mode in the first virtual room, the user may need to manually toggle an interface element indicating that collaborative mode should be enabled. For example, the user may toggle the interface element 810 described above with regard to FIGS. 8-9 in order to enter collaborative mode.

If the user toggles the interface element indicating that collaborative mode should be enabled, a visual element may be automatically added to the user's avatar. At 506, a visual element may be added to the avatar in response to entering the collaborative mode. The visual element added to the avatar may indicate that the user is available for a real-time communication with other users among the plurality of users. The visual element may be visible to other users of the communication service. The visual element may have a predetermined shape and/or a predetermined color. Adding the visual element to the user's avatar may indicate to other users that the user is available for a real-time communication, such as an impromptu audio or video meeting, with other users.

If a user has entered collaborative mode, this may indicate that the user is interested in participating in impromptu video and/or audio conferencing with other users in the first virtual room. All users in the first virtual room that have enabled the collaborative mode may automatically be added to a live video and/or audio conference with each other. At 508, the real-time communication may be initiated with any other user among the plurality of users who is also in the first virtual room and whose avatar indicates that the other user is available for a real-time communication. In some embodiments, only a subset of the users located in the first virtual room will have enabled collaborative mode. In such instances, those users that have not enabled collaborative mode will not be added to the live video and/or audio chat with the users that have enabled collaborative mode.

FIG. 6 illustrates an example process 600 for facilitating communication, which may be performed by a communication service (e.g., communication service 112) in accordance with the present disclosure. For example, the process 600 may be utilized to facilitate collaboration in a work environment. Although depicted as a sequence of operations in FIG. 6, those of ordinary skill in the art will appreciate that various embodiments may add, remove, reorder, or modify the depicted operations.

As discussed above, a user of the communication service may automatically be located in a default virtual room once an application (e.g., application 240 of FIG. 2) associated with the communication service starts to run on a computing device associated with the user. The default virtual room may be, in some instances, selected by the user. For example, a user may select a virtual room that he or she spends most of her time in as that user's default virtual room. As another example, a user may select a virtual room that is associated with a topic of highest interest to the user as that user's default room. The default virtual room for a particular user may, in some instances, be selected by the communication service. For example, the communication service may automatically select a virtual room for a particular user based on that user's behaviors or preferences, such as which virtual rooms that user visits, for how long the user visits those rooms, and which projects or topics are of interest to the user. In some embodiments, the default virtual room for a particular user may be selected by that user's colleague, such as that user's boss or superior.

In one or more embodiments, a user of the communication service may open the application associated with the communication service and may be automatically located in that user's default virtual room (e.g., first virtual room). At 602, an avatar of a user may be automatically displayed in a representation corresponding to the first virtual room once the application starts to run on a computing device associated with the user. Display of the avatar in the representation may indicate that the user is in the first virtual room. For example, as described above with regard to FIG. 8, the user corresponding to the user information 802 may be associated with an avatar 807. The avatar 807 may be displayed in the default virtual room of the user corresponding to the user information 802 once the application starts to run on a computing device associated with the user.

The user may turn on a collaborative mode in the first virtual room in order to participate in impromptu real-time communication with other users in the first virtual room. At 604, a collaborative mode may be entered based on user input from the user via an interface element. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

In embodiments, collaborative mode may, by default, by disabled or turned-off whenever the user enters the first virtual room. If the user wants to enable collaborative mode in the first virtual room, the user may need to manually toggle an interface element indicating that collaborative mode should be enabled. For example, the user may toggle the interface element 810 described above with regard to FIGS. 8-9 in order to enter collaborative mode.

If the user toggles the interface element indicating that collaborative mode should be enabled, a visual element may be automatically added to the user's avatar. At 606, a visual element may be added to the avatar in response to entering the collaborative mode. The visual element added to the avatar may indicate that the user is available for a real-time communication with other users among the plurality of users. The visual element may be visible to other users of the communication service. The visual element may have a predetermined shape and/or a predetermined color. Adding the visual element to the user's avatar may indicate to other users that the user is available for a real-time communication, such as an impromptu audio or video meeting, with other users.

The user may, after opening the application and being placed in the first virtual room, want to enter a different virtual room. For example, the user may want to communicate with other users that are in a virtual room different from the first virtual room. As another example, the user may want to communicate about the topic or project associated with a virtual room different from the first virtual room.

If the user wants to be located in a different virtual room, the user may join (e.g., enter) the different virtual room, such as by selecting a selectable interface element corresponding to the second virtual room. At 608, it may be detected that the user enters a second virtual room where any other user is located. If the user joins the second virtual room, the user may no longer be located in the first virtual room. At 610, the avatar of a user may be automatically displayed in a representation corresponding to the second virtual room in response to detecting that the user entered the second virtual room by selecting a selectable interface element. Display of the avatar in the representation may indicate, such as to other users, that the user is in the second virtual room. The user's avatar may no longer be displayed in the representation corresponding to the first virtual room.

If the user enters collaborative mode in the second virtual room, this may indicate that the user is interested in participating in impromptu video and/or audio conferencing with other users in the second virtual room. All users in the second virtual room that have enabled the collaborative mode may automatically be added to a live video and/or audio conference with each other. At 612, the real-time communication may be initiated with the other user based on the detecting that the user enters the second virtual room and detecting that an interface element is enabled (e.g., collaborative mode is enabled). In some embodiments, only a subset of the users located in the second virtual room will have enabled collaborative mode. In such instances, those users that have not enabled collaborative mode will not be added to the live video and/or audio chat with the users that have enabled collaborative mode.

FIG. 7 illustrates an example process 700 for facilitating communication, which may be performed by a communication service (e.g., communication service 112) in accordance with the present disclosure. For example, the process 700 may be utilized to facilitate collaboration in a work environment. Although depicted as a sequence of operations in FIG. 7, those of ordinary skill in the art will appreciate that various embodiments may add, remove, reorder, or modify the depicted operations.

As discussed above, a user of the communication service may automatically be located in a default virtual room once an application (e.g., application 240 of FIG. 2) associated with the communication service starts to run on a computing device associated with the user. The default virtual room may be, in some instances, selected by the user. For example, a user may select a virtual room that he or she spends most of her time in as that user's default virtual room. As another example, a user may select a virtual room that is associated with a topic of highest interest to the user as that user's default room. The default virtual room for a particular user may, in some instances, be selected by the communication service. For example, the communication service may automatically select a virtual room for a particular user based on that user's behaviors or preferences, such as which virtual rooms that user visits, for how long the user visits those rooms, and which projects or topics are of interest to the user. In some embodiments, the default virtual room for a particular user may be selected by that user's colleague, such as that user's boss or superior.

In one or more embodiments, a user of the communication service may open the application associated with the communication service and may be automatically located in that user's default virtual room (e.g., first virtual room). At 702, an avatar of a user may be automatically displayed in a representation corresponding to the first virtual room once the application starts to run on a computing device associated with the user. Display of the avatar in the representation may indicate that the user is in the first virtual room. For example, as described above with regard to FIG. 8, the user corresponding to the user information 802 may be associated with an avatar 807. The avatar 807 may be displayed in the default virtual room of the user corresponding to the user information 802 once the application starts to run on a computing device associated with the user.

The user may turn on a collaborative mode in the first virtual room in order to participate in impromptu real-time communication with other users in the first virtual room. At 704, a collaborative mode may be entered based on user input from the user. If a user has turned the collaborative mode on, this may indicate that the user is interested in participating in impromptu video and/or audio conferencing with other users in the virtual room. All users in a virtual room that have enabled the collaborative mode may automatically be added to a live video and/or audio conference with each other. In some embodiments, only a subset of the users located in a particular virtual room will have enabled collaborative mode. In such instances, those users that have not enabled collaborative mode will not be added to the live video and/or audio chat with the users that have enabled collaborative mode.

If the user enters collaborative mode, a visual element may be automatically added to the user's avatar. At 706, a visual element may be added to the avatar in response to entering the collaborative mode. The visual element added to the avatar may indicate that the user is available for a real-time communication with other users among the plurality of users. The visual element may be visible to other users of the communication service. The visual element may have a predetermined shape and/or a predetermined color. Adding the visual element to the user's avatar may indicate to other users that the user is available for a real-time communication, such as an impromptu audio or video meeting, with other users in the first virtual room.

For various reasons, the user may want to participate in a live, synchronous communication with only a portion (e.g., subset) of the other users in the first virtual room. For example, if three other people are in the first virtual room, the user may want to have a real-time communication with only one or two of the other users in the virtual room. To do so, the first user may request to establish a private bubble chat with those other users with whom the user wants to communicate. At 708, a request may be received from the user to communicate with a subset of users in the first virtual room. The live bubble chat may be established in response to the request. At 710, a sub-communication channel may be established between the user and the subset of users in the first virtual room while exiting the collaborative mode. For example, the communication channel associated with the bubble chat may be a sub-channel of the communication channel associated with the virtual room. The two users may participate in real-time communication inside of the bubble chat. The sub-communication channel may not be accessible to those users that are in the first virtual room but that are not in the bubble chat.

FIG. 13 illustrates a computing device that may be used in various aspects, such as the services, networks, modules, and/or devices depicted in FIG. 1. With regard to the example architecture of FIG. 1, the cloud network 102, user device 104a-d (collectively user device 104), communication service 112, database(s) 113, and/or network 120 may each be implemented by one or more instance of a computing device 1300 of FIG. 13. Likewise, with regard to the example architecture of FIG. 2, the authentications service 226, the management service 223 (and any of its components), the chat service 222, and/or the video conference service 253 may each be implemented by one or more instance of a computing device 1300 of FIG. 13.

The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random-access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN). The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. The mass storage device 1328 may comprise a management component 1310. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on the mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described above. The computing device 1300 may have access to computer-readable storage media storing computer-executable instructions, which, when executed by the computing device 1300, may perform the methods described herein.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of facilitating collaboration in a workspace, comprising:
　　automatically displaying an avatar of a user in a representation corresponding to a first virtual room once an application starts to run on a computing device associated with the user, wherein display of the avatar in the representation indicates that the user is in the first virtual room, the user is any user among a plurality of users in the workspace, and the first virtual room is among a plurality of virtual rooms in the workspace;
　　entering a collaborative mode in response to receiving user input from the user via an interface element, wherein the interface element is configured to enable and disable the collaborative mode, and wherein entering the collaborative mode indicates that the user is interested in participating in an impromptu real-time communication; and automatically adding a visual element to the avatar in response to entering the collaborative mode, wherein the visual element added to the avatar indicates that the user is available for the impromptu real-time communication.

2. The method of claim 1, wherein the impromptu real-time communication comprises an impromptu audio or video meeting.

3. The method of claim 1, further comprising:
initiating the real-time communication with any other user among the plurality of users whose avatar indicates that the other user is available for a real-time communication.

4. The method of claim 3, further comprising:
initiating the real-time communication with the other user based on detecting that an interface element is enabled, wherein the other user is also in the first virtual room.

5. The method of claim 3, further comprising:
initiating the real-time communication with the other user based on detecting that the user enters a second virtual room where the other user is located and detecting that the interface element is enabled.

6. The method of claim 5, further comprising:
displaying the avatar in another representation corresponding to the second virtual room in response to detecting the user enters the second virtual room by selecting a selectable interface element.

7. The method of claim 1, wherein the first virtual room is pre-selected and indicates the user's work context.

8. The method of claim 1, further comprising:
entering the collaborative mode based on receiving the user input via another interface element.

9. The method of claim 1, wherein the visual element has a predetermined shape or a predetermined color.

10. The method of claim 1, further comprising:
receiving a request from the user to communicate with a subset of users in the first virtual room; and
establishing a sub-communication channel between the user and the subset of users in the first virtual room while exiting the collaborative mode.

11. A system of facilitating a collaborative work environment, comprising:
at least one memory; and
at least one processor in communication with the at least one memory, wherein instructions stored in the at least one memory upon execution by the at least one processor cause the system to perform operations comprising:
automatically displaying an avatar of a user in a representation corresponding to a first virtual room once an application starts to run on a computing device associated with the user, wherein display of the avatar in the representation indicates that the user is in the first virtual room, the user is any user among a plurality of users in the workspace, the first virtual room is among a plurality of virtual rooms in the workspace, and the plurality of virtual rooms are asynchronously accessible by the plurality of users;
entering a collaborative mode in response to receiving user input from the user via an interface element, wherein the interface element is configured to enable and disable the collaborative mode, and wherein entering the collaborative mode indicates that the user is interested in participating in an impromptu real-time communication; and
automatically adding a visual element to the avatar in response to entering the collaborative mode, wherein the visual element added to the avatar indicates that the user is available for the impromptu real-time communication.

12. The system of claim 11, the operations further comprising:
initiating the real-time communication with any other user among the plurality of users whose avatar indicates that the other user is available for a real-time communication.

13. The system of claim 12, the operations further comprising:
initiating the real-time communication with the other user based on detecting that an interface element is enabled, wherein the other user is also in the first virtual room.

14. The system of claim 12, the operations further comprising:
initiating the real-time communication with the other user based on detecting that the user enters a second virtual room where the other user is located and detecting that an interface element is enabled.

15. The system of claim 14, the operations further comprising:
displaying the avatar in another representation corresponding to the second virtual room in response to detecting the user enters the second virtual room by selecting a selectable interface element.

16. A non-transitory computer-readable storage medium, storing computer-readable instructions that upon execution by a computing device cause the computing device to perform operations comprising:
automatically displaying an avatar of a user in a representation corresponding to a first virtual room once an application starts to run on a computing device associated with the user, wherein display of the avatar in the representation indicates that the user is in the first virtual room, the user is any user among a plurality of users in the workspace, the first virtual room is among a plurality of virtual rooms in the workspace, and the plurality of virtual rooms are asynchronously accessible by the plurality of users;
entering a collaborative mode in response to receiving user input from the user via an interface element, wherein the interface element is configured to enable and disable the collaborative mode, and wherein entering the collaborative mode indicates that the user is interested in participating in an impromptu real-time communication; and
automatically adding a visual element to the avatar in response to entering the collaborative mode, wherein the visual element added to the avatar indicates that the user is available for the impromptu real-time communication.

17. The non-transitory computer-readable storage medium of claim 16, the operations further comprising:
initiating the real-time communication with any other user among the plurality of users whose avatar indicates that the other user is available for a real-time communication.

18. The non-transitory computer-readable storage medium of claim 16, the operations further comprising:
entering the collaborative mode based on receiving the user input via another interface element.

19. The non-transitory computer-readable storage medium of claim 16, wherein the visual element has a predetermined shape or a predetermined color.

20. The non-transitory computer-readable storage medium of claim 16, the operations further comprising:
- receiving a request from the user to communicate with a subset of users in the first virtual room; and
- establishing a sub-communication channel between the user and the subset of users in the first virtual room while exiting the collaborative mode.

* * * * *